US012705630B2

(12) United States Patent
Agrawal

(10) Patent No.: US 12,705,630 B2
(45) Date of Patent: Aug. 11, 2026

(54) ONLINE SOFTWARE PLATFORM (OSP) REPORTING PERIODICALLY TO DOMAIN BASED ON CUMULATIVE BASE VALUES OF RECEIVED DATASETS, AND CHANGING THE FREQUENCY OF REPORTING BASED ON THE CUMULATIVE BASE VALUES

(71) Applicant: Avalara, Inc., Seattle, WA (US)

(72) Inventor: Naveen Kumar Agrawal, Bellevue, WA (US)

(73) Assignee: Avalara, Inc., Seattle, WA (US)

( * ) Notice: Subject to any disclaimer, the term of this patent is extended or adjusted under 35 U.S.C. 154(b) by 0 days.

(21) Appl. No.: 18/899,316

(22) Filed: Sep. 27, 2024

(65) Prior Publication Data

US 2025/0104097 A1 Mar. 27, 2025

Related U.S. Application Data

(60) Provisional application No. 63/585,717, filed on Sep. 27, 2023.

(51) Int. Cl.
*G06Q 30/018* (2023.01)
*G06F 16/28* (2019.01)

(52) U.S. Cl.
CPC ......... *G06Q 30/018* (2013.01); *G06F 16/288* (2019.01)

(58) Field of Classification Search
CPC ............................ G06Q 30/018; G06F 16/288
See application file for complete search history.

(56) References Cited

U.S. PATENT DOCUMENTS

| | | | |
|---|---|---|---|
| 7,783,536 | B2 | 8/2010 | William et al. |
| 7,933,803 | B1 | 4/2011 | Nadler et al. |
| 8,156,019 | B2 | 4/2012 | Wilson et al. |
| 8,620,578 | B1 | 12/2013 | Brown et al. |
| 8,725,407 | B2 | 5/2014 | Hurley et al. |
| 9,760,915 | B2 | 9/2017 | Pavlou et al. |
| 10,332,216 | B2 | 6/2019 | Barsade et al. |
| 10,445,818 | B1 | 10/2019 | Chowdhary |

(Continued)

OTHER PUBLICATIONS

International Search Report and Written Opinion, PCT App. No. PCT/US2024/048945, Jan. 8, 2025, 11 pages.

(Continued)

*Primary Examiner* — Courtney Harmon
(74) *Attorney, Agent, or Firm* — Christopher Wickstrom; Frontier IP Law PLLC

(57) ABSTRACT

An embodiment is a method performed by a computer system of an online software platform (OSP). The method includes receiving, via a network, a set of datasets of relationship instances that are associated with a primary entity, a domain from a plurality of domains, and a time period and maintaining a cumulative base value associated with the primary entity, the domain, and the time period. The method further includes responsive to determining that the cumulative base value exceeds a predefined threshold value, changing a reporting period length associated with the primary entity and the domain from a first reporting period length to a second reporting period length that is shorter than the first reporting period length and causing a report to be prepared and transmitted via the network to a computer system of the domain using the second reporting period length.

12 Claims, 15 Drawing Sheets

(56) References Cited

U.S. PATENT DOCUMENTS

| | | | |
|---|---|---|---|
| 10,769,611 | B2 | 9/2020 | McNeel |
| 10,872,100 | B1 | 12/2020 | Shefferman et al. |
| 11,176,620 | B1 | 11/2021 | Lubczynski et al. |
| 11,238,542 | B1 | 2/2022 | Wixted et al. |
| 11,475,430 | B2 | 10/2022 | Burton et al. |
| 2002/0138765 | A1 | 9/2002 | Fishman |
| 2004/0059634 | A1 | 3/2004 | Tami et al. |
| 2007/0136158 | A1 | 6/2007 | Rawlings et al. |
| 2007/0136159 | A1 | 6/2007 | Rawlings et al. |
| 2013/0013471 | A1 | 1/2013 | Fishman |
| 2014/0172656 | A1 | 6/2014 | Shaw |
| 2014/0351105 | A1 | 11/2014 | Hamm |
| 2016/0042466 | A1 | 2/2016 | Herndon et al. |
| 2016/0140668 | A1 | 5/2016 | Maguire et al. |
| 2016/0314423 | A1* | 10/2016 | Mole ................ G06Q 10/06393 |
| 2021/0158456 | A1 | 5/2021 | Morgan et al. |
| 2021/0166330 | A1* | 6/2021 | Baker ..................... G06F 9/466 |
| 2021/0365643 | A1* | 11/2021 | Agrawal ................ G06N 20/00 |
| 2022/0006872 | A1* | 1/2022 | Kavounas ............. H04L 67/562 |
| 2022/0398285 | A1 | 12/2022 | Rose et al. |

OTHER PUBLICATIONS

Kos, “Umsatzsteuer: Die Regeln im Uberblick—dhz .net (Sales Tax: The Rules at a Glance)”, Deutsche Handwerks Zeitung, Jan. 7, 2020, 6 pages (3 pages of English Translation and 3 pages of Original Document).

* cited by examiner

| ID | TM | DN | B1 | ••• |
|---|---|---|---|---|
| ID | TM | DN | B2 | ••• |
| ID | TM | DN | B3 | ••• |
| ID | TM | DN | B4 | ••• |
| ID | TM | DN | B5 | ••• |
| ID | TM | DN | B6 | ••• |

⋮

309

CB=B1+B2+B3+B4+B5+B6+••• > THRESHOLD

*SUMMING THE BASE VALUES OF ARRIVING DATASETS*

FIG. 3

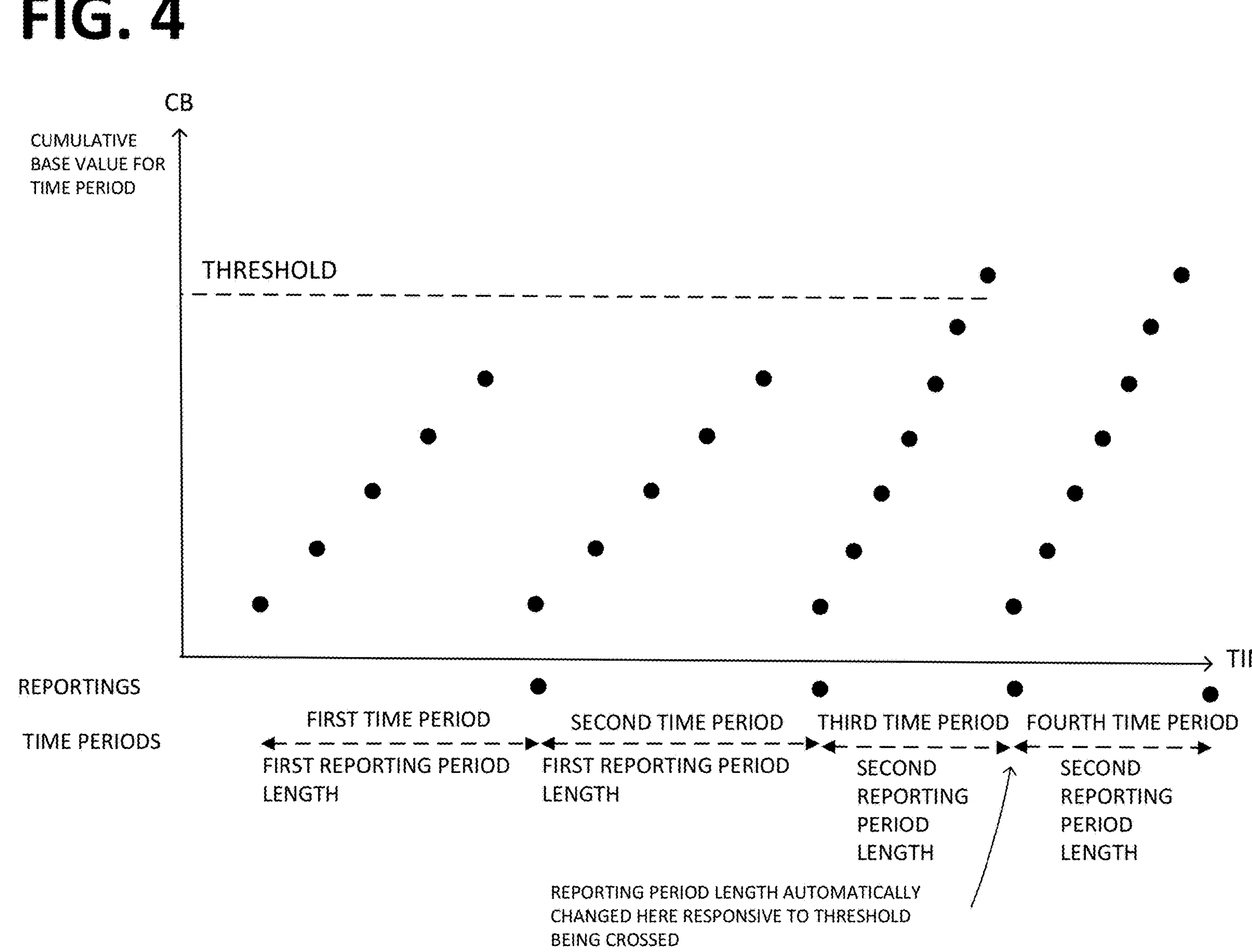
FIG. 4
CB
CUMULATIVE BASE VALUE FOR TIME PERIOD
THRESHOLD
TIME
REPORTINGS
TIME PERIODS
FIRST TIME PERIOD
FIRST REPORTING PERIOD LENGTH
SECOND TIME PERIOD
FIRST REPORTING PERIOD LENGTH
THIRD TIME PERIOD
SECOND REPORTING PERIOD LENGTH
FOURTH TIME PERIOD
SECOND REPORTING PERIOD LENGTH
REPORTING PERIOD LENGTH AUTOMATICALLY CHANGED HERE RESPONSIVE TO THRESHOLD BEING CROSSED

Figure 5:
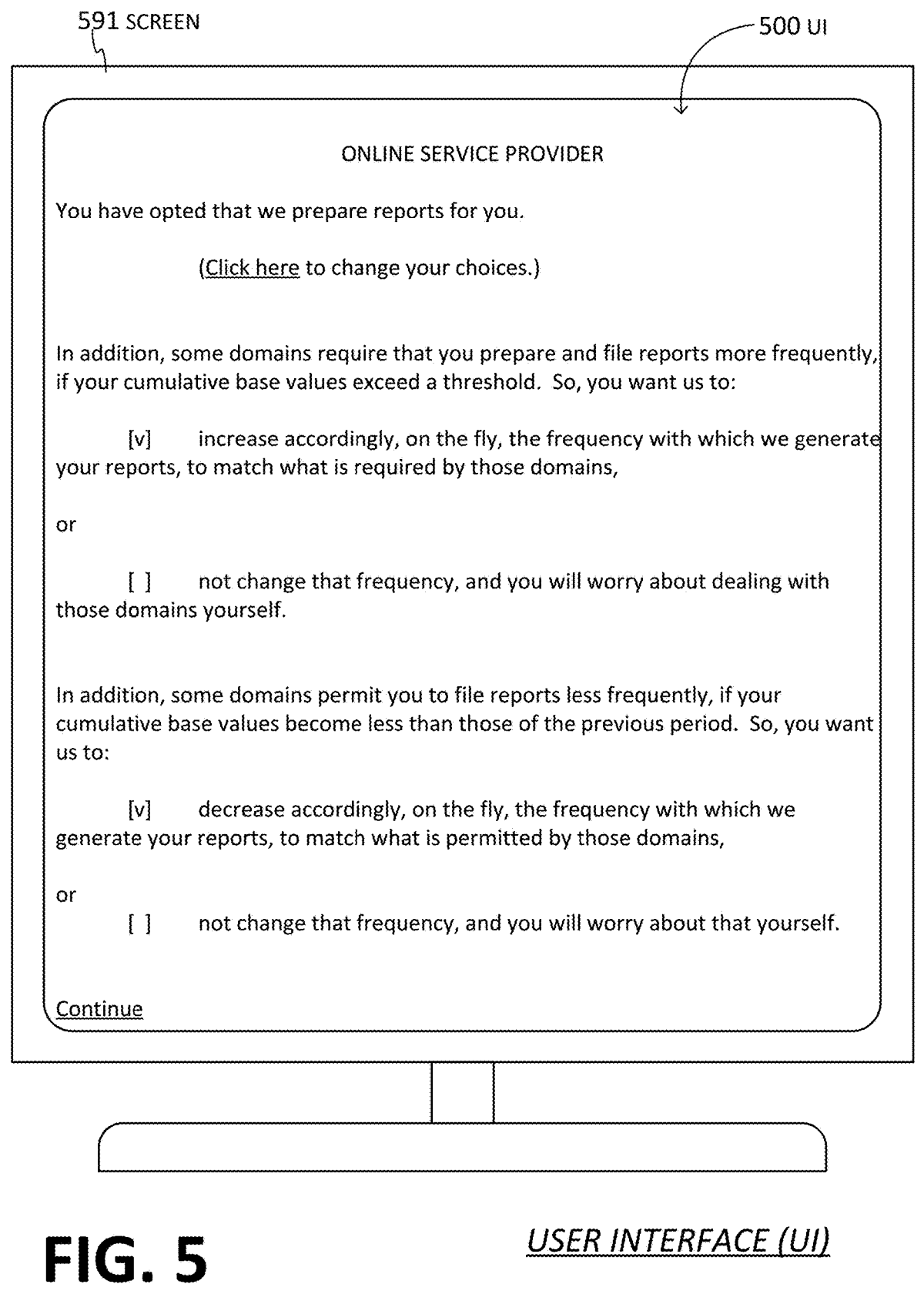

591 SCREEN

500 UI

ONLINE SERVICE PROVIDER

You have opted that we prepare reports for you.

(Click here to change your choices.)

In addition, some domains require that you prepare and file reports more frequently, if your cumulative base values exceed a threshold. So, you want us to:

[v] increase accordingly, on the fly, the frequency with which we generate your reports, to match what is required by those domains, or

[ ] not change that frequency, and you will worry about dealing with those domains yourself.

In addition, some domains permit you to file reports less frequently, if your cumulative base values become less than those of the previous period. So, you want us to:

[v] decrease accordingly, on the fly, the frequency with which we generate your reports, to match what is permitted by those domains, or

[ ] not change that frequency, and you will worry about that yourself.

USER INTERFACE (UI)

600

610 RECEIVE, VIA A NETWORK, A SET OF DATASETS OF RELATIONSHIP INSTANCES THAT ARE ASSOCIATED WITH A PRIMARY ENTITY, A DOMAIN FROM A PLURALITY OF DOMAINS, AND A TIME PERIOD, WHEREIN EACH DATASET OF THE SET OF DATASETS INCLUDES A BASE VALUE FOR A PARTICULAR RELATIONSHIP INSTANCE

620 MAINTAIN A CUMULATIVE BASE VALUE ASSOCIATED WITH THE PRIMARY ENTITY, THE DOMAIN, AND THE TIME PERIOD, WHEREIN THE CUMULATIVE BASE VALUE REPRESENTS A SUM OF THE BASE VALUES INCLUDED IN THE SET OF DATASETS

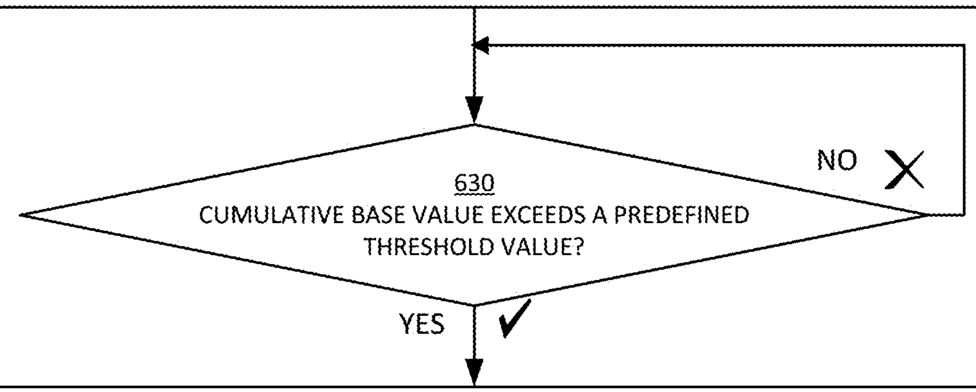

640 CHANGE A REPORTING PERIOD LENGTH ASSOCIATED WITH THE PRIMARY ENTITY AND THE DOMAIN FROM A FIRST REPORTING PERIOD LENGTH TO A SECOND REPORTING PERIOD LENGTH THAT IS SHORTER THAN THE FIRST REPORTING PERIOD LENGTH

650 CAUSE A REPORT TO BE PREPARED AND TRANSMITTED VIA THE NETWORK TO A COMPUTER SYSTEM OF THE DOMAIN USING THE SECOND REPORTING PERIOD LENGTH, WHEREIN THE REPORT INCLUDES STATISTICS OF DATASETS OF RELATIONSHIP INSTANCES THAT ARE ASSOCIATED WITH THE PRIMARY ENTITY, THE DOMAIN, AND A PRECEDING TIME PERIOD THAT HAS A LENGTH CORRESPONDING TO THE SECOND REPORTING PERIOD LENGTH

FIG. 6

*METHODS*

*METHODS*

800

810 RECEIVE, VIA A NETWORK, A SET OF DATASETS OF RELATIONSHIP INSTANCES THAT ARE ASSOCIATED WITH A PRIMARY ENTITY, A DOMAIN FROM A PLURALITY OF DOMAINS, AND A TIME PERIOD, WHEREIN EACH DATASET OF THE SET OF DATASETS INCLUDES A BASE VALUE FOR A PARTICULAR RELATIONSHIP INSTANCE

820 MAINTAIN A CUMULATIVE BASE VALUE ASSOCIATED WITH THE PRIMARY ENTITY, THE DOMAIN, AND THE TIME PERIOD, WHEREIN THE CUMULATIVE BASE VALUE REPRESENTS A CUMULATIVE SUM OF THE BASE VALUES INCLUDED IN THE SET OF DATASETS

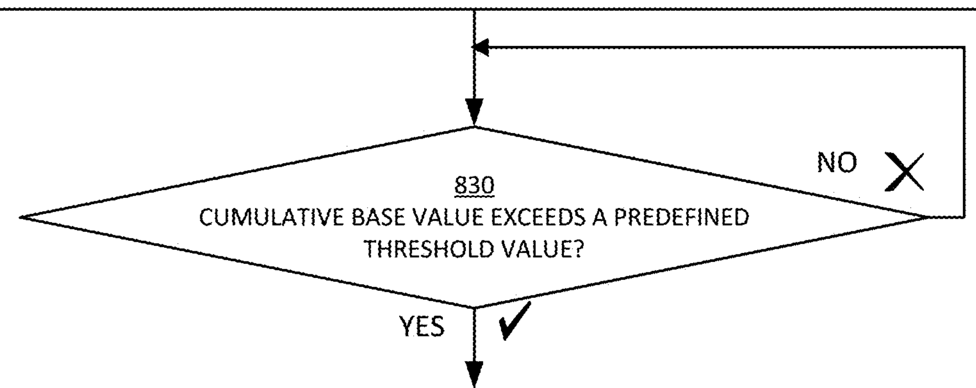

840 DETERMINE THAT A REPORT OF A PARTICULAR REPORT TYPE IS TO BE PREPARED, WHEREIN THE PARTICULAR REPORT TYPE IS DIFFERENT FROM A TYPE OF REPORT CURRENTLY BEING PREPARED BY THE OSP ON BEHALF OF THE PRIMARY ENTITY

850 CAUSE THE REPORT OF THE PARTICULAR REPORT TYPE TO BE PREPARED AND TRANSMITTED VIA THE NETWORK TO A COMPUTER SYSTEM OF THE DOMAIN, WHEREIN THE REPORT OF THE PARTICULAR REPORT TYPE INCLUDES STATISTICS OF DATASETS OF RELATIONSHIP INSTANCES THAT ARE ASSOCIATED WITH THE PRIMARY ENTITY, THE DOMAIN, AND A PRECEDING TIME PERIOD

FIG. 8

*METHODS*

*USE CASE*

*USE CASE*

CB=SP1+SP2+SP3+SP4+SP5+SP6+ ••• > THRESHOLD

*USE CASE*

*SUMMING THE SALES PRICE VALUES FROM THE ARRIVING DATASETS*

Figure 13:
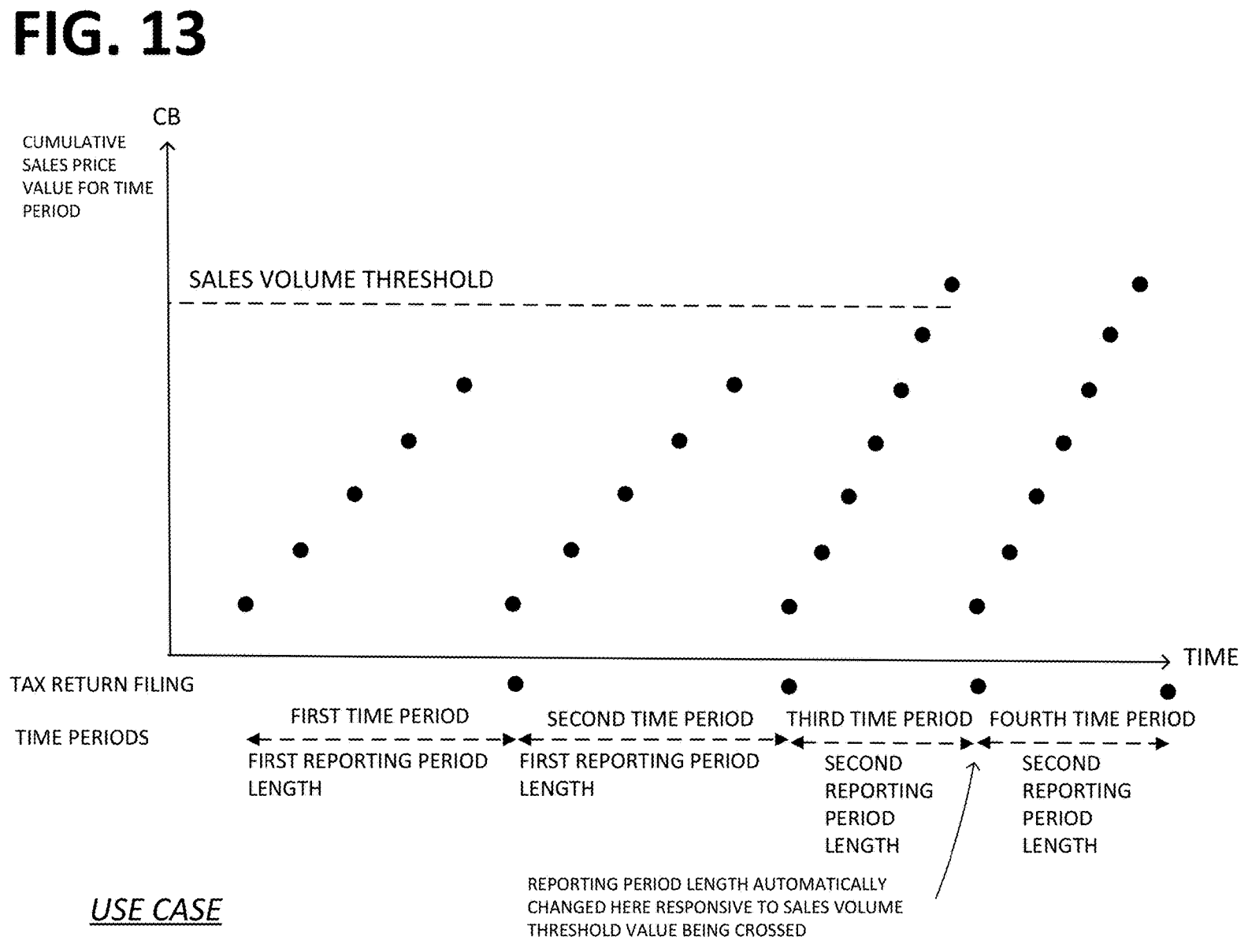

CUMULATIVE SALES PRICE VALUE FOR TIME PERIOD

SALES VOLUME THRESHOLD

TIME

TAX RETURN FILING

TIME PERIODS

FIRST TIME PERIOD

SECOND TIME PERIOD

THIRD TIME PERIOD

FOURTH TIME PERIOD

FIRST REPORTING PERIOD LENGTH

FIRST REPORTING PERIOD LENGTH

SECOND REPORTING PERIOD LENGTH

SECOND REPORTING PERIOD LENGTH

REPORTING PERIOD LENGTH AUTOMATICALLY CHANGED HERE RESPONSIVE TO SALES VOLUME THRESHOLD VALUE BEING CROSSED

USE CASE

USER INTERFACE (UI)

USER INTERFACE (UI)

ONLINE SOFTWARE PLATFORM (OSP) REPORTING PERIODICALLY TO DOMAIN BASED ON CUMULATIVE BASE VALUES OF RECEIVED DATASETS, AND CHANGING THE FREQUENCY OF REPORTING BASED ON THE CUMULATIVE BASE VALUES

CROSS-REFERENCE TO RELATED APPLICATIONS

This application claims the benefit of U.S. Provisional Application No. 63/585,717, filed Sep. 27, 2023, which is hereby incorporated by reference.

This application is also related to International Application No. PCT/US2024/048945, filed Sep. 27, 2024, which also claims priority to U.S. Provisional Application No. 63/585,717, filed Sep. 27, 2023, which is hereby incorporated by reference.

BACKGROUND

An online software platform (OSPs) may receive datasets from users of the OSP over a network and perform actions (e.g., computations) with the datasets that are useful to the users. For example, an OSP may periodically prepare a report based on datasets received from a user of the OSP and transmit the report to a computer system of a domain to satisfy a reporting requirement of the domain. The user may be an agent of an entity that has an obligation to comply with the reporting requirement of the domain. Such entity may be referred to as a reporting entity. Each dataset may describe aspects of a relationship instance. Each relationship instance may be associated with the reporting entity, the domain, and a particular date/time. The dataset of a relationship instance may include a base value for the relationship instance and possibly other values describing other aspects of the relationship instance. The report prepared by the OSP on behalf of the reporting entity may include statistics of datasets of relationship instances. The report may cover relationship instances that occurred during a particular time period. The reporting requirement of a domain may specify the length of the time period that the report is to cover, which may also be referred to as a reporting period length. The reporting period length may correspond to a calendar year, a calendar month, or a quarter of the calendar year, just to provide a few examples. When reporting periodically, the reporting period length may have an inverse relationship with reporting frequency—a longer reporting period length corresponds to less frequent reporting and a shorter reporting period length corresponds to more frequent reporting. In some cases, the reporting requirement of a domain may require or permit the reporting period length for a reporting entity to be changed depending on certain conditions being met such as the cumulative sum of the base values for relationship instances exceeding a threshold value or not exceeding a threshold value during a particular time period.

Disadvantageously, users of an OSP have to keep track of when the reporting period length for a reporting entity should or can be changed, and manually configure the OSP to prepare reports using the new reporting period length each time. Oftentimes, however, users forget to configure the OSP or incorrectly configure the OSP, which results in the OSP preparing reports on behalf of the reporting entity more frequently or less frequently than required by the domain. Preparing reports more frequently than required by the domain may result in the unnecessary consumption of scarce computing resources such as central processing unit (CPU) time, memory, and network bandwidth. Preparing reports less frequently than required by the domain may result in the reporting entity not being in compliance with the reporting requirement of the domain, which can lead to penalties for the reporting entity (e.g., fines, revocation of licenses, etc.) and/or other adverse consequences.

SUMMARY

The present disclosure is about instances of computer systems, storage media that may store programs, and methods.

According to some embodiments, a computer system of an online software platform (OSP) receives, via a network, a first set of datasets of relationship instances that are associated with a primary entity, a first domain from a plurality of domains, and a first time period. The length of the first time period may correspond to a first reporting period length. Each dataset of the first set of datasets includes a base value for the relationship instance that the dataset represents. The computer system maintains a first cumulative base value associated with the primary entity, the first domain, and the first time period as the computer system receives and processes the first set of datasets. The first cumulative base value represents a cumulative sum of the base values included in the first set of datasets processed by the computer system thus far. The computer system detects when the first cumulative base value is greater than a first predefined threshold value. Responsive to detecting that the first cumulative base value is greater than the first predefined threshold value, the computer system changes a reporting period length associated with the primary entity and the first domain from the first reporting period length to a second reporting period length that is shorter than the first reporting period length. Thereafter, the computer system causes a first report to be prepared and transmitted via the network to a computer system of the first domain using the second reporting period length. The first report includes statistics of datasets of relationship instances that are associated with the primary entity, the first domain, and a preceding time period that has a length corresponding to the second reporting period length.

According to some embodiments, a computer system of an OSP receives, via a network, a second set of datasets of relationship instances that are associated with the primary entity, the first domain, and a second time period. The length of the second time period may correspond to a third reporting period length. Each dataset of the second set of datasets includes a base value for the relationship instance that the dataset represents. The computer system maintains a second cumulative base value associated with the primary entity, the first domain, and the second time period as the computer system receives and processes the second set of datasets. The second cumulative base value represents a cumulative sum of the base values included in the second set of datasets processed by the computer system thus far. At the end of the second time period, the computer system determines whether the second cumulative base value is less than a second predefined threshold value. Responsive to determining that the second cumulative base value is less than the second predefined threshold value, the computer system changes the reporting period length associated with the primary entity and the first domain from the third reporting period length to a fourth reporting period length that is longer than the third reporting period length. Thereafter, the computer system causes a second report to be prepared and transmitted via the network to a computer system of the first domain using the fourth reporting period length. The second report includes statistics of datasets of relationship instances that are associated with the primary entity, the first domain, and a preceding time period that has a length corresponding to the fourth reporting period length.

An advantage provided by embodiments is that they can automatically prepare reports using the appropriate reporting period length as required or permitted by the domain. Conventionally, the reporting entity (e.g., via an agent of the reporting entity) has to manually configure the reporting period length in the OSP for each domain. However, different domains may require or permit the use of different reporting period lengths. Furthermore, some domains may require that the reporting period length be shortened for a reporting entity if the cumulative sum of base values for relationship instances exceeds a threshold value during a particular time period. Also, some domains may permit the reporting period length to be lengthened for a reporting entity if the cumulative sum of base values for relationship instances does not exceed a threshold value at the end of a particular time period. In some cases, the reporting entity may forget to update the reporting period length in the OSP (e.g., due to not recognizing that the cumulative sum of base values has exceeded a threshold value) or incorrectly configure the reporting period length in the OSP (e.g., due to human error or mistake). This may result in the OSP preparing reports on behalf of the reporting entity more frequently or less frequently than required by the domain. Preparing reports more frequently than required by the domain may result in the unnecessary consumption of scarce computing resources such as CPU time, memory, and network bandwidth. Preparing reports less frequently than required by the domain may result in the reporting entity not being in compliance with the reporting requirement of the domain, which can lead to penalties for the reporting entity (e.g., fines, revocation of licenses, etc.) and/or other adverse consequences. The above-described problems may be compounded if the reporting entity has an obligation to periodically submit reports for multiple different domains each potentially having different reporting requirements.

Embodiments can automatically detect in real time when the reporting behavior of a reporting entity should/can be changed and automatically effectuate the new reporting behavior without requiring manual intervention from the reporting entity. Embodiments can keep reporting entities in compliance with the reporting requirements of potentially many domains and conserve computing resources of an OSP by avoiding the preparation of unnecessary reports.

These and other features and advantages of the claimed invention will become more readily apparent in view of the embodiments described and illustrated in this specification, namely in this written specification and the associated drawings.

BRIEF DESCRIPTION OF THE DRAWINGS

The invention may best be understood by referring to the following description and accompanying drawings that are used to illustrate embodiments of the invention. In the drawings:

FIG. 3 is a diagram showing how a cumulative base value can be generated based on summing the base values of arriving datasets, according to some embodiments.

FIG. 4 is a diagram showing the reporting period length being shortened due to the cumulative base value exceeding a predefined threshold value during a time period, according to some embodiments.

FIG. 5 is a diagram showing a sample user interface (UI) shown on a screen, according to some embodiments.

FIG. 6 is a flowchart for a method to dynamically shorten a reporting period length, according to some embodiments.

FIG. 8 is a flowchart for a method to dynamically start preparing a report of a particular report type, according to some embodiments.

FIG. 13 is a diagram showing the reporting period length being shortened due to the cumulative sales price value exceeding a predefined sales volume threshold value, according to some embodiments.

DETAILED DESCRIPTION

The present disclosure is about computer systems, storage media that may store programs, and methods.

Figure 1:
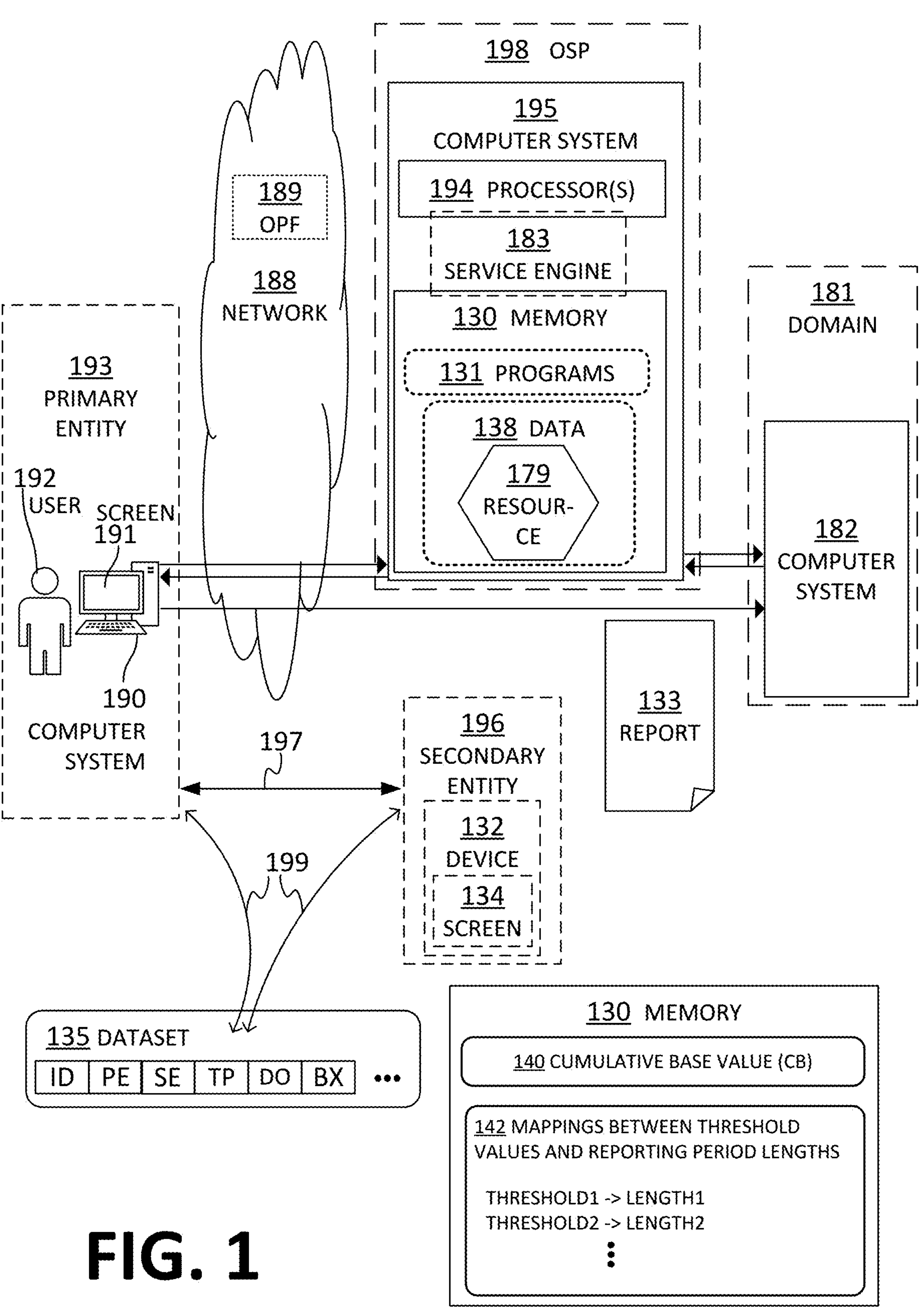
FIG. 1 is a diagram showing a sample computer system, according to some embodiments.

FIG. 1 is a diagram showing a sample computer system, according to some embodiments.

As shown in the diagram, the computer system 195 has one or more processors 194 and a memory 130. The memory 130 may store programs 131 and data 138. The one or more processors 194 and the memory 130 of the computer system 195 may implement a service engine 183. Additional optional implementation details for the computer system 195 may be those shown and described later in this document for FIG. 9.

The computer system 195 can be located in "the cloud." In fact, the computer system 195 may optionally be implemented as part of an Online Software Platform (OSP) 198. The computer system 195 can be configured to perform one or more predefined services on behalf of users, for example via operations of the service engine 183. Such services can be searches, determinations, computations, verifications, notifications, the transmission of specialized information, including data that effectuates payments, the production of resources, the generation and transmission of documents and reports, the online accessing of other systems to effect registrations, and so on, including what is described in this disclosure. Producing the resource 179 and/or report 133 can be part of one of these services. Such services can be provided in the form of Software as a Service (SaaS).

The computer system 195 (e.g., via service engine 183) may prepare reports such as report 133 on behalf of entities such as the primary entity 193. The computer system 195 may transmit such reports to the computer systems of domains such as computer system 182 of domain 181 and/or transmit such reports to the computer systems operated by users such as computer system 190 operated by user 192. As will be described in additional detail herein, the computer system 195 may dynamically change the reporting period length used for preparing reports based on whether a cumulative base value for relationship instances exceeds a threshold value during a time period and/or based on whether a cumulative base value for relationship instances does not exceed a threshold value at the end of a time period.

A computer system 182 can be part of a domain 181. The domain 181 may be defined by geographic boundaries, political boundaries, commercial boundaries, or the like. The domain 181 may have a reporting requirement that requires entities such as primary entity 193 and/or secondary entity 196 to periodically report data/statistics regarding relationship instances associated with those entities and the domain 181. An entity that has an obligation to prepare and submit reports to a domain 181 may be referred to as a reporting entity. The reporting requirement of the domain 181 may indicate that the reports should cover a particular time period having a particular length. Such length may be referred to as the reporting period length. The reporting period length may correspond to a calendar year, a quarter of a calendar year, a calendar month, or other length of time. In some cases, a domain 181 may require or permit the reporting period length for a reporting entity to be changed depending on certain conditions being met such as the cumulative sum of the base values for relationship instances exceeding or not exceeding a threshold value during a particular time period.

A user 192 may be standalone. The user 192 may use a computer system 190 that has a screen 191, on which user interfaces (UIs) may be shown. In embodiments, the user 192 and the computer system 190 are considered part of a primary entity 193, which could be an organization, a person, and so on. In such instances, the user 192 may be an agent of the primary entity 193, and even within a physical site of the primary entity 193, although that is not necessary. In embodiments, the computer system 190 or other device of the user 192 can be client devices for the computer system 195. The user 192 or the primary entity 193 may be users for the OSP 198. For instance, the user 192 may use the computer system 190 to log into the computer system 195 by using credentials, such as a user name, a password, a token, and so on.

The computer system 190 may access the computer system 195 via a communications network 188, such as the internet. In particular, the entities and associated systems of FIG. 1 may communicate via physical and logical channels of the communications network 188. Accordingly, from certain perspectives, the OSP 198 is in the cloud.

The computer system 190 may access the computer system 182 via a communications network 188, such as the internet. Accordingly, from certain perspectives, the computer system 182 is in the cloud. In some instances, the computer system 195 may access the computer system 182 on behalf of the primary entity 193.

Moreover, in some embodiments, data from the computer system 190, from the computer system 182, and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190 and any devices of the OPF 189 can be considered to be remote devices, at least from the perspective of the computer system 195.

Accessing, downloading and/or uploading, and so on may be permitted among these computer systems. Such can be performed, for instance, with manually uploading files, like spreadsheet files, etc. The computer system 190, the computer system 195, the computer system 182, and possibly also the OPF 189, may exchange requests and responses with each other. Such can be implemented with a number of architectures.

In embodiments, the user 192 and/or the primary entity 193 have instances of relationships with secondary entities. For sake of simplicity, only one such secondary entity 196 is shown in the diagram, but it should be appreciated that there can be more than one such secondary entity. The secondary entity 196 may be an organization, a person, and so on. In some embodiments, the secondary entity 196 has a device 132, which can be an electronic device such as a cellphone, tablet, laptop, computer system and so on. The device 132 may have a screen 134.

In the example shown in the diagram, the primary entity 193 has a relationship instance 197 with the secondary entity 196. The secondary entity 196 may have used a device such as the device 132 to create the relationship instance 197. The primary entity 193 and/or the secondary entity 196 may be referred to simply as entities.

In some instances, the user 192 and/or the primary entity 193 obtains data about one or more secondary entities, for example as necessary for conducting the relationship instances with them. The obtained data can be about attributes of the entities, or of the relationship instances.

In embodiments, the computer system 195 receives one or more datasets. Each dataset may describe aspects of a particular relationship instance. Thus, each dataset may represent a particular relationship instance. A sample received dataset 135 is shown. The received dataset 135 may describe aspects of the relationship instance 197. The dataset 135 may be received by the computer system 195 in a number of ways. In some embodiments, one or more requests may be received by the computer system 195 via a network. The received one or more requests can carry payloads that encode datasets of relationship instances between the primary entity 193 and the secondary entity 196 (and possibly other secondary entities). In such embodiments, the one or more payloads may be parsed by the computer system 195 to extract the dataset 135.

In embodiments, the dataset 135 has parameters that can also be called dataset parameters. At least some of the dataset parameters may have respective values that can also be called dataset values. The dataset values may be numerical, alphanumeric, Boolean, and so on, as needed for what the parameters characterize. For example, the dataset 135 shown in the diagram includes an identifier (ID) parameter, a primary entity (PE) parameter, a secondary entity (SE) parameter, a time period (TP) parameter, a domain (DO) parameter, and a base value (BX) parameter. The value of the ID parameter may be an identifier of the dataset 135 (e.g., an arbitrary number assigned to the dataset), so as to differentiate it from other such datasets. At least one of the dataset values may characterize an attribute of a certain one of the entities 193 and 196, as indicated by correspondence arrows 199. For instance, the value of the PE parameter may indicate information regarding the primary entity 193 such as the name of the primary entity 193, the identifier assigned to the primary entity 193, the physical address of the primary entity 193, the network address of the primary entity 193, and/or contact information for the primary entity 193. Similarly, the value of the SE parameter may indicate information regarding the secondary entity 196 such as the name of the secondary entity 196, the identifier assigned to the secondary entity 196, the physical address of the secondary entity 196, the network address of the secondary entity 196, and/or contact information for the secondary entity 196. In embodiments, the dataset values characterize attributes of both the primary entity 193 and the secondary entity 196, but that is not required. The value of the TP parameter may indicate the date/time at which the relationship instance occurred. The time period associated with the relationship instance can be inferred from the value of the TP parameter. The value of the DO parameter may indicate the domain associated with the relationship instance. A relationship instance may be associated with a domain due to the primary entity 193 associated with the relationship instance being geographically located within the domain 181 or otherwise being associated with the domain 181 and/or the secondary entity 196 associated with the relationship instance being geographically located within the domain 181 or otherwise being associated with the domain 181. The value of the BX parameter may indicate the base value for the relationship instance. The value of the BX parameter may be a numerical value that characterizes an aspect of the relationship instance.

The dataset 135 may further have additional dataset parameters, as indicated by the horizontal dot-dot-dot in the right side of the dataset 135. In this disclosure, a dot-dot-dot, whether horizontal or vertical, means "potentially more of" what it is shown together with. This is just one illustrative example of a suitable dataset 135. Other embodiments may include only some of these parameters, may include different parameters entirely, the parameters may be rearranged variously within the dataset 135, and so on.

In embodiments, the computer system 195 may identify a domain associated with the relationship instance represented by the dataset 135. In an embodiment, the computer system 195 identifies the domain based on the domain parameter value included in the dataset 135. In an embodiment, the primary entity 193 provides domain information to the computer system 195 separately from the dataset 135 and the computer system 195 identifies the domain based on the received domain information. In an embodiment, the computer system 195 infers the domain based on values included in the dataset 135 and/or other information provided by the primary entity 193 or known about the primary entity 193 and/or the secondary entity 196.

In embodiments, the computer system 195 produces a resource for the dataset 135, such as the resource 179. The produced resource can be a document, a determination, a computational result, etc., made, created or prepared for the user 192, and/or the primary entity 193, and/or the secondary entity 196, etc. As such, in some embodiments, the resource is produced by processing and/or a computation. In some embodiments, the resource for a dataset 135 is produced based at least on the value of the BX parameter (i.e., a base value) of the dataset 135.

The dataset 135 is shown only as an example. In fact, the computer system 195 may receive multiple datasets for multiple domains from the primary entity 193, for its relationship instances. Also, datasets may be received incrementally over a long time.

In an embodiment, as shown in the diagram, the computer system 195 maintains in memory 130 a cumulative base value 140 associated with the primary entity 193, the domain 181, and a current time period. The current time period may have a length that corresponds to a reporting period length specified by the reporting requirement of the domain 181. The computer system 195 may initialize the cumulative base value 140 to a value of zero at the beginning of the current time period. As the computer system 195 receives datasets of relationship instances associated with the primary entity 193, the domain 181, and the current time period (e.g., the TP parameter value can be used to determine whether a relationship instance is associated with the current time period), the computer system 195 may parse the base values (the values of the BX parameter) from those datasets and update the cumulative base value 140 by adding each base value to the currently stored cumulative base value 140. Thus, the cumulative base value 140 may represent a cumulative sum of base values included in datasets of relationship instances associated with the primary entity 193, the domain 181, and the current time period. Although for the sake of simplicity the diagram shows the computer system 195 as maintaining a single cumulative base value 140 in memory 130, it should be appreciated that the computer system 195 may maintain multiple such cumulative base values for the primary entity 193, each associated with a different domain. Also, although not shown in the diagram, it should be appreciated that the computer system 195 may maintain separate cumulative base values for multiple different reporting entities besides the primary entity 193.

In an embodiment, as shown in the diagram, the computer system195 maintains in memory 130 mappings 142 between threshold values and reporting period lengths. The mapping may be specific to a particular domain 181 and reflect the reporting requirement of the domain 181. The mapping may be stored in the memory 130 using any suitable data structure. A mapping between a threshold value and a reporting period length may indicate that the reporting period length should be used for preparing reports when the cumulative base value 140 exceeds the threshold value during a time period. For example, in the example shown in the diagram, a first mapping of the mappings 142 maps a first threshold value (THRESHOLD1) to a first reporting period length (LENGTH1), which indicates that LENGTH1 should be used as the reporting period length for preparing reports if the cumulative base value 140 exceeds THRESHOLD1 during a given time period. The second mapping of the mappings 142 maps a second threshold value (THRESHOLD2) to a second reporting period length (LENGTH2), which indicates that LENGTH2 should be used as the reporting period length for preparing reports if the cumulative base value 140 exceeds THRESHOLD2 during a given time period. Although for the sake of simplicity the diagram shows the computer system 195 as maintaining mappings 142 for a single domain 181, it should be appreciated that the computer system 195 may maintain separate mappings for multiple different domains other than the domain 181, each reflecting the reporting requirements of the respective domains.

The threshold values shown in the diagram are upper threshold values in the sense that a change in reporting period length is triggered when the cumulative base value 140 exceeds the threshold values. In an embodiment, the mappings 142 may include mappings between lower threshold values and a reporting period length. A mapping between a lower threshold value and a reporting period length may indicate that the reporting period length should be used for preparing reports when the cumulative base value 140 does not exceed the lower threshold value at the end of a time period.

Example operations of the computer system 195 for dynamically changing the reporting behavior for a reporting entity are now described.

In operation, the computer system 195 may receive, via the network 188, a first set of datasets of relationship instances that are associated with the primary entity 193, the domain 181, and a first time period, wherein each dataset of the first set of datasets includes a base value for a particular relationship instance. The first time period may have a length that corresponds to a first reporting period length. The computer system 195 may maintain a cumulative base value 140 associated with the primary entity 193, the domain 181, and the first time period, wherein the cumulative base value 140 represents a cumulative sum of the base values included in the first set of datasets. If the computer system 195 detects that the cumulative base value 140 exceeds a predefined threshold value (e.g., a threshold value included in mappings 142), the computer system 195 may change a reporting period length associated with the primary entity 193 and the domain 181 from the first reporting period length to a second reporting period length (a length corresponding to the threshold value in mappings 142) that is shorter than the first reporting period length. The computer system 195 may then cause a report 133 to be prepared using the second reporting period length and transmit the report 133 via the network 188 to a computer system 182 of the domain 181. The report 133 may include statistics of datasets of relationship instances that are associated with the primary entity 193, the domain 181, and a preceding time period that has a length corresponding to the second reporting period length. In an embodiment, the computer system 195 causes the prepared report 133 to be presented to an authorized agent of the primary entity 193 for electronic signature before transmitting the (signed) report 133 to the computer system 182 of the domain 181 on behalf of the primary entity 193.

In operation, the computer system 195 may receive, via the network 188, a second set of datasets of relationship instances that are associated with the primary entity 193, the domain 181, and a second time period, wherein each dataset of the second set of datasets includes a base value for a particular relationship instance. The second time period may have a length that corresponds to a third reporting period length. The computer system 195 may maintain a cumulative base value 140 associated with the primary entity 193, the domain 181, and the second time period, wherein the cumulative base value 140 represents a cumulative sum of the base values included in the second set of datasets. If the computer system 195 determines that the cumulative base value 140 does not exceed a predefined threshold value (e.g., a threshold value included in mappings 142) at the end of the second time period, the computer system 195 may change a reporting period length associated with the primary entity 193 and the domain 181 from the third reporting period length to a fourth reporting period length (a length corresponding to the threshold value in mappings 142) that is longer than the third reporting period length. The computer system 195 may then cause a report 133 to be prepared using the fourth reporting period length and transmit the report 133 via the network 188 to a computer system 182 of the domain 181. The report 133 may include statistics of datasets of relationship instances that are associated with the primary entity 193, the domain 181, and a preceding time period that has a length corresponding to the fourth reporting period length. In an embodiment, the computer system 195 causes the prepared report 133 to be presented to an authorized agent of the primary entity 193 for electronic signature before transmitting the (signed) report 133 to the computer system 182 of the domain 181 on behalf of the primary entity 193.

In an embodiment the computer system 195 may start preparing a new type of report on behalf of the primary entity 193 (e.g., a type of report that is currently not being prepared on behalf of the primary entity 193) if the cumulative base value associated with the primary entity 193, the domain 181, and a time period exceeds a predefined threshold value.

For example, in operation, the computer system 195 may receive, via the network 188, a third set of datasets of relationship instances that are associated with the primary entity 193, the domain 181, and a third time period, wherein each dataset of the third set of datasets includes a base value for a particular relationship instance. The computer system 195 may maintain a cumulative base value 140 associated with the primary entity 193, the domain 181, and the third time period, wherein the cumulative base value 140 represents a cumulative sum of the base values included in the third set of datasets. If the computer system 195 detects that the cumulative base value 140 exceeds a predefined threshold value, the computer system 195 may determine that a report of a particular report type is to be prepared, wherein the particular report type is different from a type of report currently being prepared by the computer system 195 on behalf of the primary entity 193. The computer system 195 may then cause a report of the particular report type to be prepared and transmitted via the network 188 to a computer system 182 of the domain 181. The report may include statistics of datasets of relationship instances that are associated with the primary entity 193, the domain 181, and a preceding time period (e.g., but might have different statistics and/or a different format from reports that are currently being prepared on behalf of the primary entity 193). In an embodiment, the computer system 195 causes the prepared report to be presented to an authorized agent of the primary entity 193 for electronic signature before transmitting the (signed) report to the computer system 182 of the domain 181 on behalf of the primary entity 193.

In an embodiment, relationship instances can be associated with certain items, and the computer system 195 maintains cumulative base values on a per-item basis. For example, the computer system 195 may maintain a cumulative base value that is associated with the primary entity 193, the domain 181, a particular item, and a time period. The computer system 195 may cause a new type of report (e.g., that pertains to the particular item) to be prepared if it detects that such cumulative base value exceeds a predefined threshold value during the time period.

Figure 2:
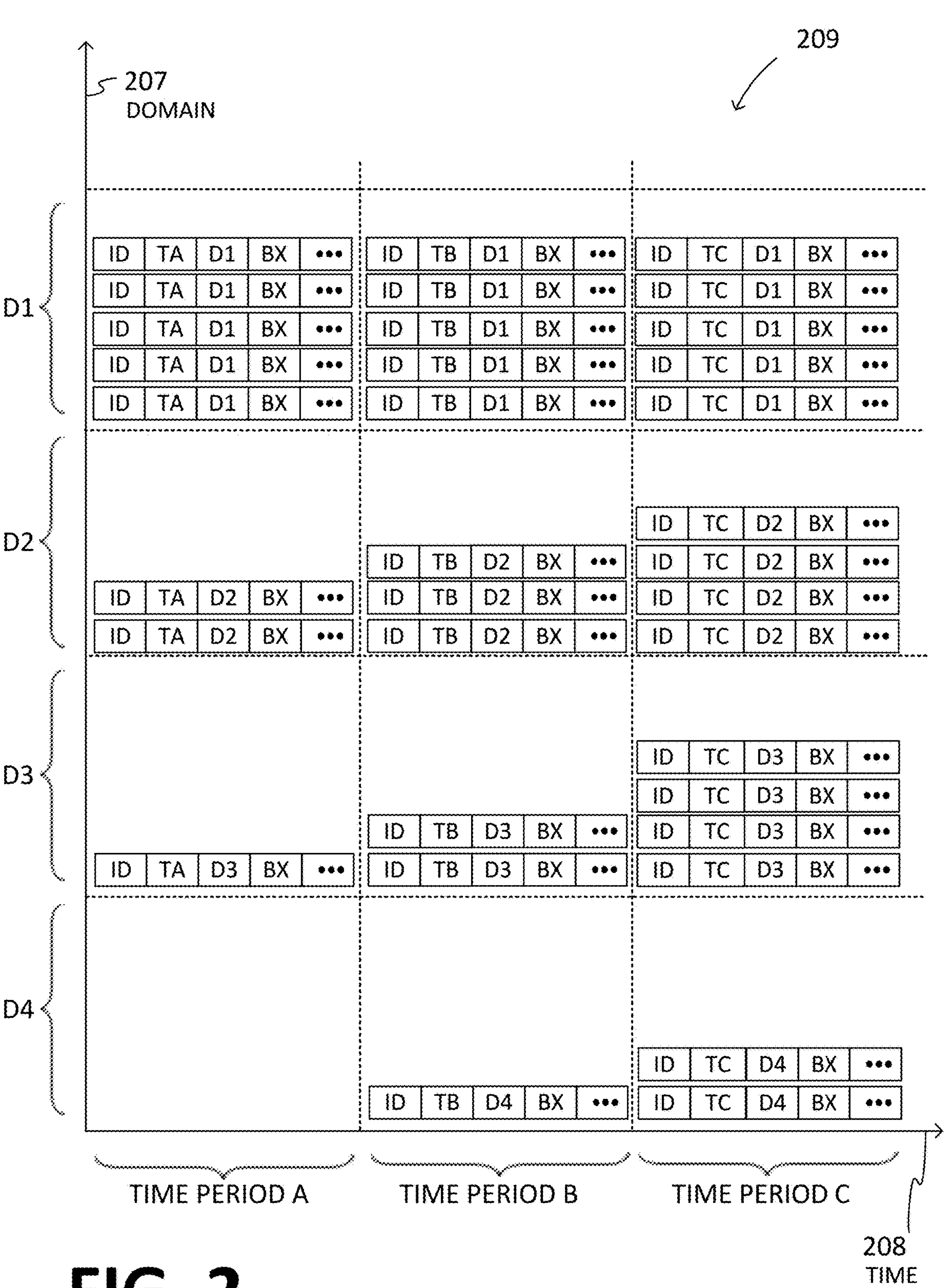
FIG. 2 is a diagram showing how sample datasets received by the online software platform (OSP) can be grouped or categorized, according to some embodiments.

FIG. 2 is a diagram showing how sample datasets received by the OSP can be grouped or categorized, according to some embodiments.

As shown in the diagram, the datasets 209 may be grouped or categorized along a vertical domain axis 207 and a horizontal time axis 208 to form a matrix of cells, where each cell of the matrix contains the datasets of relationship instances that occurred during a particular time period and that are associated with a particular domain.

A confusion that should not reign is that, while in FIG. 2 the datasets are shown in buckets of time periods, in embodiments they may be processed dynamically as they are received during the time periods.

Each dataset of the datasets 209 may describe aspects of a particular relationship instance. In this sense, each dataset may represent a particular relationship instance. Each dataset may include an ID value that uniquely identifies the dataset. Each dataset may also include a date/time value that indicates the date/time at which the relationship instance represented by the dataset occurred. The time period during which a relationship instance occurred can be inferred from the date/time value. For understanding how datasets can be grouped or categorized, the time period during which a relationship instance occurred is more significant than the actual date/time at which the relationship occurred so the date/time values are shown as time period values. In this example, the time period value is one of three values: TA (time period A), TB (time period B), and TC (time period C). Each dataset may include a domain value that indicates the domain associated with the relationship instance represented by the dataset. In this example, the domain value is one of four values: D1 (domain 1), D2 (domain 2), D3 (domain 3), and D4 (domain 4). Each dataset may include a base value for the relationship instance represented by the dataset. The base value may be a numerical value. In the diagram, the base value is shown using the base value parameter symbol BX. Each dataset may have potentially different base values but the actual base values are not shown in the diagram since the actual values are not necessary for understanding how datasets can be grouped or categorized. Each dataset may have additional values (corresponding to additional parameters), as indicated by the horizontal dot-dot-dots.

As described herein, in some embodiments, the base values for relationship instances associated with the same domain and time period are cumulatively summed, starting with zero, at the beginning of the time period. If the cumulative sum exceeds a predefined threshold value during the time period, the reporting period length may be shortened (e.g., to increase the reporting frequency). In embodiments, if the cumulative sum does not exceed a predefined threshold value at the end of the time period, the reporting period length is lengthened (e.g., to decrease the reporting frequency).

FIG. 3 is a diagram showing how a cumulative base value can be generated based on summing the base values of arriving datasets, according to some embodiments.

The datasets 309 shown in the diagram may be the datasets of any one of the cells of the matrix shown in FIG. 2. The datasets 309 may thus have the same domain value of DN and the same time period value of TM. However, the datasets 309 have different numeric base values of B1, B2, B3, B4, B5, and B6, respectively, for the base value parameter. Although not shown in the diagram, the datasets 309 may represent relationship instances associated with a particular primary entity. Thus, the datasets 309 may represent relation instances associated with the particular primary entity, the domain DN, and the time period TM. The time period TM may have a length that corresponds to a particular reporting period length specified by the reporting requirement of the domain DN.

In embodiments, the computer system of the OSP (e.g., computer system 195 shown in FIG. 1) may periodically prepare reports (e.g., report 133 shown in FIG. 1) that include statistics of datasets of relationship instances associated with the primary entity, the domain DN, and a preceding time period that has a length corresponding to a reporting period length. The computer system may transmit the reports to the computer system of the domain DN (e.g., computer system 182 shown in FIG. 1) on behalf of the primary entity and/or transmit the reports to the computer system of the primary entity (e.g., computer system 190 shown in FIG. 1) so that an agent of the primary entity can submit the reports to the computer system of the domain DN (e.g., by uploading the reports to the computer system 182 of the domain 181 or by other means).

In embodiments, the computer system of the OSP maintains a cumulative base value (e.g., cumulative base value 140 shown in FIG. 1) that is associated with the primary entity, the domain DN, and the time period TM by summing the base values of the datasets 309 as each dataset is received and/or processed. The cumulative base value may be designated using the symbol CB. The cumulative base value may be initialized to a value of zero at the beginning of the current time period TM and then gradually increase as the datasets 309 are received and/or processed. The computer system may compare the cumulative base value to a predefined threshold value (e.g., a threshold value included in the mappings 142 shown in FIG. 1) to determine whether the cumulative base value has exceeded the predefined threshold value. If the computer system determines that that the cumulative base value has exceeded the predefined threshold value during the current time period TM, then the computer system may shorten the reporting period length, which is equivalent to increasing the reporting frequency.

FIG. 4 is a diagram showing the reporting period length being shortened due to the cumulative base value exceeding a predefined threshold value during a time period, according to some embodiments.

The diagram shows a graph with an x-axis that represents time and a y-axis that represents the cumulative base value during a given time period. A cumulative base value may be maintained during a first time period as datasets of relationship instances associated with a reporting entity, a domain, and the first time period are received and processed. The first time period may have a length that corresponds to a first reporting period length as specified by the reporting requirement of the domain. In this example, the cumulative base value does not exceed the predefined threshold value during the first time period. Thus, there is no change to the reporting period length. At the end of the first time period, a report may be prepared for the first time period and the report may be sent to the computer system of the domain. The cumulative base value is reset (to zero) at the beginning of the second time period. The second time period may have a length corresponding to the first reporting period length. A cumulative base value may be maintained during the second time period as datasets of relationship instances associated with the reporting entity, the domain, and the second time period are received and processed. In this example, the cumulative base value again does not exceed the predefined threshold value during the second time period. Thus, there is no change to the reporting period length. At the end of the second time period, a report may be prepared for the second time period and the report may be sent to the computer system of the domain. The cumulative base value is reset (to zero) at the beginning of the third time period. The third time period initially has a length corresponding to the first reporting period length but, as will be described in additional detail herein, the length of the third time period may be shortened due to the cumulative base value exceeding the threshold value during the third time period. A cumulative base value may be maintained during the third time period as datasets of relationship instances associated with the reporting entity, the domain, and the third time period are received. In this example, the cumulative base value exceeds the predefined threshold value during the third time period. As a result, the reporting period length may be shortened to have a length that corresponds to a second reporting period length. The shortened reporting period length may apply to the current time period in which the cumulative base value exceeded the predefined threshold value or the following time period. In this example, it is assumed that the shortened reporting period length applies to the current time period. Thus, the length of the third time period is shortened so that it corresponds to the second reporting period length (instead of the first reporting period length). A report may be prepared for the (shortened) third time period and the report may be sent to the computer system of the domain. The cumulative base value is reset (to zero) at the beginning of the fourth time period. The fourth time period may have a length corresponding to the second reporting period length. A report is prepared for the fourth time period and the report may be sent to the computer system of the domain. In an embodiment, the second reporting period length may continue to be used for preparing reports until a cumulative base value does not exceed a threshold value by the end of a time period. In an embodiment, the second reporting period length is used for preparing reports for a predefined number of time periods and then reports are subsequently prepared using the first reporting period length again.

The reporting period lengths may depend on the reporting requirement of the domain. For example, the domain may have a table that maps threshold values to reporting period lengths, where the larger the threshold value the shorter the reporting period length. The contents of the table may be stored in memory (e.g., memory 130 shown in FIG. 1) so that they can be easily retrieved.

In an embodiment, if the cumulative base value does not exceed a predefined threshold value at the end of the current time period, the reporting period length may lengthen, and a report is not prepared using the first reporting period length, but is prepared using a second reporting period length that is longer than the first reporting period length. Thus, if the cumulative base value is too low by the end of the current time period, a report may not be prepared yet, but prepared and submitted later.

FIG. 5 is a diagram showing a sample UI shown on a screen, according to some embodiments. In embodiments, the user is enabled to choose the feature of dynamically changing the reporting period length used for preparing reports as an option using a UI shown on a screen 591. The screen 591 could be the screen 191 of FIG. 1. The UI 500 can be displayed to a user to allow the user to configure the OSP to dynamically change the reporting period lengths used for preparing reports according to the reporting requirement of a domain. In particular, the UI 500 presents an option for the user to have the OSP increase, on the fly, the reporting frequency (e.g., shorten the reporting period length) if the cumulative base value exceeds a threshold value during a time period (e.g., to comply with the requirement of the domain) and also presents an option for the user to have the OSP decrease, on the fly, the reporting frequency (e.g., lengthen the reporting period length) if the cumulative base value does not exceed another predefined threshold value by the end of a time period (e.g., if permitted by the reporting requirement of the domain).

FIG. 6 is a flowchart for a method to dynamically shorten a reporting period length, according to some embodiments. The method 600 may be performed by a computer system, such as the sample computer system 195 of FIG. 1, the computer system 990 or 995 of FIG. 9, or another suitable computer system. The computer system performing the method 600 may be part of an OSP.

At operation 610, the computer system receives, via a network, a set of datasets of relationship instances that are associated with a primary entity, a domain from a plurality of domains, and a time period, wherein each dataset of the set of datasets includes a base value for a particular relationship instance. In an embodiment, each dataset of the set of datasets further includes a domain value indicating that a particular relationship instance is associated with the domain. In an embodiment, each dataset of the set of datasets further includes a time value indicating that a particular relationship instance is associated with the time period.

At operation 620, the computer system maintains a cumulative base value associated with the primary entity, the domain, and the time period, wherein the cumulative base value represents a cumulative sum of the base values included in the set of datasets.

At operation 630, the computer system determines whether the cumulative base value exceeds a predefined threshold value. If the cumulative base value exceeds the predefined threshold value, then the flow proceeds to operation 640. Otherwise, if the cumulative base value does not exceed the predefined threshold value, then the flow proceeds back to operation 630, where the computer system continues to determine whether the cumulative base value exceeds the predefined threshold value.

At operation 640, the computer system changes a reporting period length associated with the primary entity and the domain from a first reporting period length to a second reporting period length that is shorter than the first reporting period length. In an embodiment, the first reporting period length corresponds to a calendar year and the second reporting period length corresponds to a quarter of the calendar year. In an embodiment, the first reporting period length corresponds to a quarter of a calendar year and the second reporting period length corresponds to a calendar month.

At operation 650, the computer system causes a report to be prepared and transmitted via the network to a computer system of the domain using the second reporting period length, wherein the report includes statistics of datasets of relationship instances that are associated with the primary entity, the domain, and a preceding time period that has a length corresponding to the second reporting period length.

In an embodiment, the computer system determines to use the predefined threshold value and the second reporting period length based on performing a look up in a data structure (e.g., stored in memory 130) that includes mappings between threshold values and reporting period lengths for the domain.

In an embodiment, the computer system generates a user interface that allows an agent of the primary entity to request that the OSP automatically change the reporting period length associated with the primary entity and the domain based on cumulative base values and causes the user interface to be displayed on a screen of a device operated by the agent of the primary entity.

Figure 7:
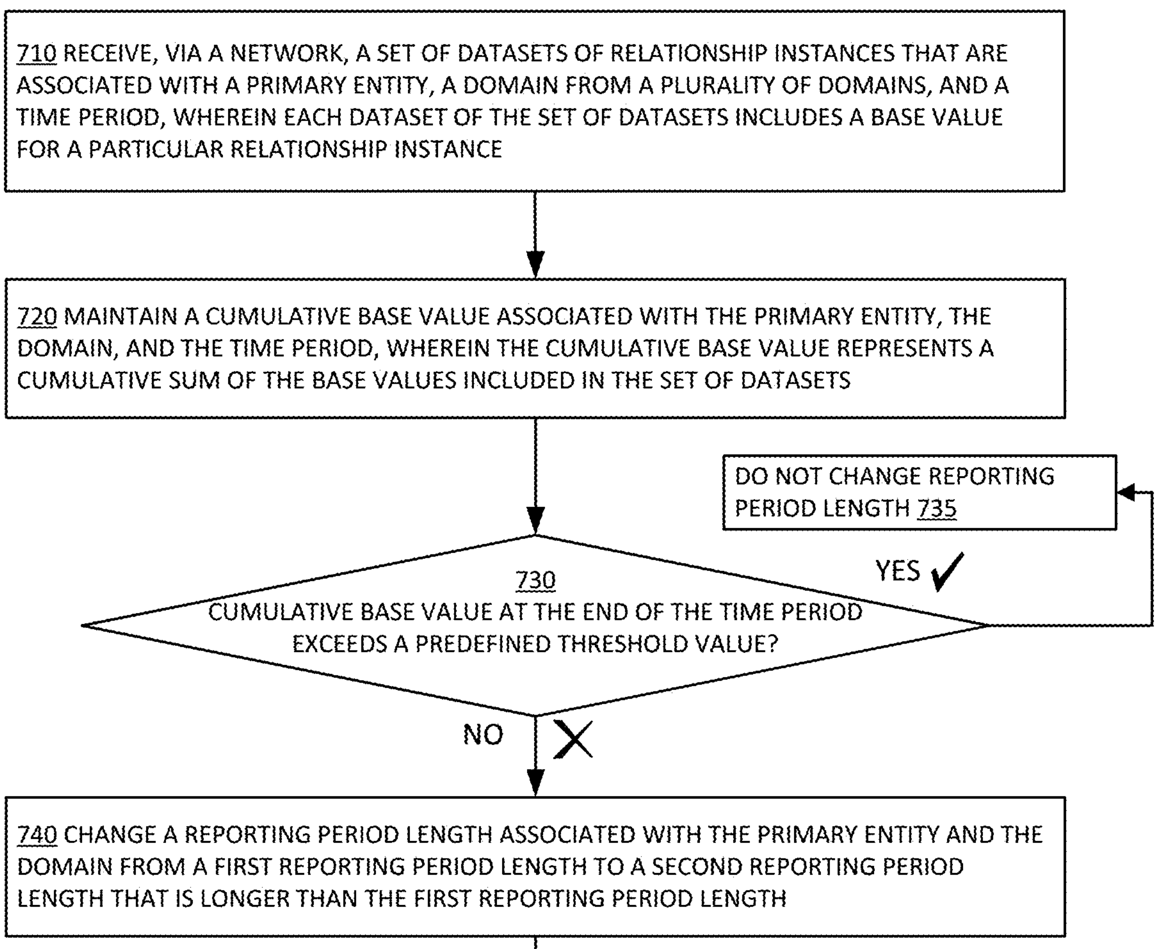
FIG. 7 is a flowchart for a method to dynamically lengthen a reporting period length, according to some embodiments.

FIG. 7 is a flowchart for a method to dynamically lengthen a reporting period length, according to some embodiments. The method 700 may be performed by a computer system, such as the sample computer system 195 of FIG. 1, the computer system 990 or 995 of FIG. 9, or another suitable computer system. The computer system performing the method 700 may be part of an OSP.

At operation 710, the computer system receives, via a network, a set of datasets of relationship instances that are associated with a primary entity, a domain from a plurality of domains, and a time period, wherein each dataset of the set of datasets includes a base value for a particular relationship instance. In an embodiment, each dataset of the set of datasets further includes a domain value indicating that a particular relationship instance is associated with the domain. In an embodiment, each dataset of the set of datasets further includes a time value indicating that a particular relationship instance is associated with the time period.

At operation 720, the computer system maintains a cumulative base value associated with the primary entity, the domain, and the time period, wherein the cumulative base value represents a cumulative sum of the base values included in the set of datasets.

At operation 730, the computer system determines at the end of the time period whether the cumulative base value exceeds a predefined threshold value. If the cumulative base value does not exceed the predefined threshold value at the end of the time period, then the flow proceeds to operation 740. Otherwise, if the cumulative base value exceeds the predefined threshold value at the end of the time period, then the flow proceeds to operation 735, where the computer system does not change the reporting period length.

At operation 740, the computer system changes a reporting period length associated with the primary entity and the domain from a first reporting period length to a second reporting period length that is longer than the first reporting period length. In an embodiment, the first reporting period length corresponds to a quarter of a calendar year and the second reporting period length corresponds to a calendar year. In an embodiment, the first reporting period length corresponds to a calendar month and the second reporting period length corresponds to a quarter of a calendar year.

At operation 750, the computer system causes a report to be prepared and transmitted via the network to a computer system of the domain using the second reporting period length, wherein the report includes statistics of datasets of relationship instances that are associated with the primary entity, the domain, and a preceding time period that has a length corresponding to the second reporting period length.

In an embodiment, the computer system determines to use the predefined threshold value and the second reporting period length based on performing a look up in a data structure (e.g., stored in memory 130) that includes mappings between threshold values and reporting period lengths for the domain.

In an embodiment, the computer system generates a user interface that allows an agent of the primary entity to request that the OSP automatically change the reporting period length associated with the primary entity and the domain based on cumulative base values and causes the user interface to be displayed on a screen of a device operated by the agent of the primary entity.

FIG. 8 is a flowchart for a method to dynamically start preparing a report of a particular report type, according to some embodiments. The method 800 may be performed by a computer system, such as the sample computer system 195 of FIG. 1, the computer system 990 or 995 of FIG. 9, or another suitable computer system. The computer system performing the method 800 may be part of an OSP.

At operation 810, the computer system receives, via a network, a set of datasets of relationship instances that are associated with a primary entity, a domain from a plurality of domains, and a time period, wherein each dataset of the set of datasets includes a base value for a particular relationship instance.

At operation 820, the computer system maintains a cumulative base value associated with the primary entity, the domain, and the time period, wherein the cumulative base value represents a cumulative sum of the base values included in the set of datasets.

At operation 830, the computer system determines whether the cumulative base value exceeds a predefined threshold value. If the cumulative base value exceeds the predefined threshold value, then the flow proceeds to operation 840. Otherwise, if the cumulative base value does not exceed the predefined threshold value, then the flow proceeds back to operation 630, where the computer system continues to determine whether the cumulative base value exceeds the predefined threshold value.

At operation 840, the computer system determines that a report of a particular report type is to be prepared, wherein the particular report type is different from a type of report currently being prepared by the OSP on behalf of the primary entity.

At operation 850, the computer system causes a report of the particular report type to be prepared and transmitted via the network to a computer system of the domain, wherein the report of the particular report type includes statistics of datasets of relationship instances that are associated with the primary entity, the domain, and a preceding time period.

DETAILS ABOUT COMPUTER SYSTEMS

Figure 9:
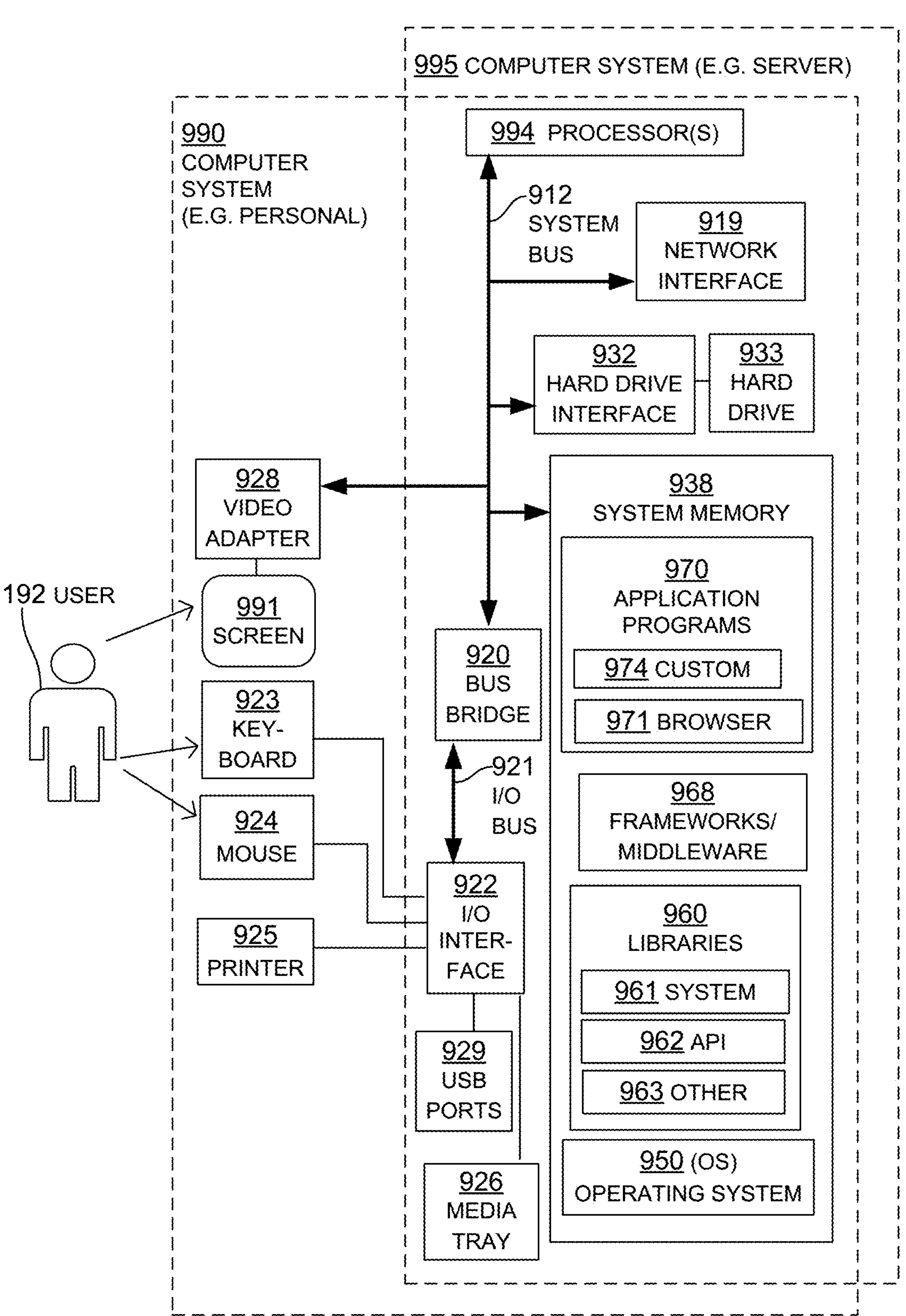
FIG. 9 is a diagram showing details of a sample computer systems, according to some embodiments.

FIG. 9 is a diagram showing details of a sample computer systems, according to some embodiments. The computer system 995 may be a server, while the computer system 990 may be a personal device, such as a personal computer, a desktop computer, a personal computing device such as a laptop computer, a tablet computer, a mobile phone, and so on. Either type may be used for the computer system 195 and 190 of FIG. 1, and/or a computer system that is part of OPF 189.

The computer system 995 and the computer system 990 have similarities, which FIG. 9 exploits for purposes of economy in this document. It will be understood, however, that a component in the computer system 995 may be implemented differently than the same component in the computer system 990. For instance, a memory in a server may be larger than a memory in a personal computer, and so on. Similarly, custom application programs 974 that implement embodiments may be different, and so on.

The computer system 995 includes one or more processors 994. The processor(s) 994 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 994 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost, time, and performance considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 995, or the computer system 990, are not intended to be exhaustive. Rather, they are representative, for highlighting essential components that can be used with embodiments.

The computer system 995 also includes a system bus 912 that is coupled to the processor(s) 994. The system bus 912 can be used by the processor(s) 994 to control and/or communicate with other components of the computer system 995.

The computer system 995 additionally includes a network interface 919 that is coupled to system bus 912. Network interface 919 can be used to access a communications network, such as the network 188. Network interface 919 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 995 also includes various memory components. These memory components include memory components shown separately in the computer system 995, plus cache memory within the processor(s) 994. Accordingly, these memory components are examples of non-transitory machine-readable media. The memory components shown separately in the computer system 995 are variously coupled, directly or indirectly, with the processor(s) 994. The coupling in this example is via the system bus 912.

Instructions for performing any of the methods or functions described in this document may be stored, completely or partially, within the memory components of the computer system 995, etc. Therefore, one or more of these non-transitory computer-readable media can be configured to store instructions which, when executed by one or more processors 994 of a host computer system such as the computer system 995 or the computer system 990, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 995 include a non-volatile hard drive 933. The computer system 995 further includes a hard drive interface 932 that is coupled to the hard drive 933 and to the system bus 912.

The memory components of the computer system 995 include a system memory 938. The system memory 938 includes volatile memory including, but not limited to, cache memory, registers and buffers. In embodiments, data from the hard drive 933 populates registers of the volatile memory of the system memory 938.

In some embodiments, the system memory 938 has a software architecture that uses a stack of layers, with each layer providing a particular functionality. In this example the layers include, starting from the bottom, an Operating System (OS) 950, libraries 960, frameworks/middleware 968 and application programs 970, which are also known as applications 970. Other software architectures may include less, more, or different layers. For example, a presentation layer may also be included. For another example, some mobile or special purpose operating systems may not provide a frameworks/middleware 968.

The OS 950 may manage hardware resources and provide common services. The libraries 960 provide a common infrastructure that is used by the applications 970 and/or other components and/or layers. The libraries 960 provide functionality that allows other software components to perform tasks more easily than if they interfaced directly with the specific underlying functionality of the OS 950. The libraries 960 may include system libraries 961, such as a C standard library. The system libraries 961 may provide functions such as memory allocation functions, string manipulation functions, mathematical functions, and the like.

In addition, the libraries 960 may include API libraries 962 and other libraries 963. The API libraries 962 may include media libraries, such as libraries to support presentation and manipulation of various media formats such as MPREG4, H.264, MP3, AAC, AMR, JPG, and PNG. The API libraries 962 may also include graphics libraries, for instance an OpenGL framework that may be used to render 2D and 3D in a graphic content on the screen 991. The API libraries 962 may further include database libraries, for instance SQLite, which may support various relational database functions. The API libraries 962 may additionally include web libraries, for instance WebKit, which may support web browsing functionality, and also libraries for applications 970.

The frameworks/middleware 968 may provide a higher-level common infrastructure that may be used by the applications 970 and/or other software components/modules. For example, the frameworks/middleware 968 may provide various Graphic User Interface (GUI) functions, high-level resource management, high-level location services, and so forth. The frameworks/middleware 968 may provide a broad spectrum of other APIs that may be used by the applications 970 and/or other software components/modules, some of which may be specific to the OS 950 or to a platform.

The application programs 970 are also known more simply as applications and apps. One such app is a browser 971, which is a software that can permit the user 192 to access other devices in the internet, for example while using a Graphic User Interface (GUI). The browser 971 includes program modules and instructions that enable the computer system 995 to exchange network messages with a network, for example using Hypertext Transfer Protocol (HTTP) messaging.

The application programs 970 may include one or more custom applications 974, made according to embodiments. These can be made so as to cause their host computer to perform operations according to embodiments. Of course, when implemented by software, operations according to embodiments may be implemented much faster than may be implemented by a human mind; for example, tens or hundreds of such operations may be performed per second according to embodiments, which is much faster than a human mind can do.

Other such applications 970 may include a contacts application, a book reader application, a location application, a media application, a messaging application, and so on. Applications 970 may be developed using the ANDROID™ or IOS™ Software Development Kit (SDK) by an entity other than the vendor of the particular platform, and may be mobile software running on a mobile operating system such as IOS™, ANDROID™, WINDOWS® Phone, or other mobile operating systems. The applications 970 may use built-in functions of the OS 950, of the libraries 960, and of the frameworks/middleware 968 to create user interfaces for the user 192 to interact with.

The computer system 995 moreover includes a bus bridge 920 coupled to the system bus 912. The computer system 995 furthermore includes an input/output (I/O) bus 921 coupled to the bus bridge 920. The computer system 995 also includes an I/O interface 922 coupled to the I/O bus 921.

For being accessed, the computer system 995 also includes one or more Universal Serial Bus (USB) ports 929. These can be coupled to the I/O interface 922. The computer system 995 further includes a media tray 926, which may include storage devices such as CD-ROM drives, multimedia interfaces, and so on.

The computer system 990 may include many components similar to those of the computer system 995, as seen in FIG. 9. In addition, a number of the application programs may be more suitable for the computer system 990 than for the computer system 995.

The computer system 990 further includes peripheral input/output (I/O) devices for being accessed by a user more routinely. As such, the computer system 990 includes a screen 991 and a video adapter 928 to drive and/or support the screen 991. The video adapter 928 is coupled to the system bus 912.

The computer system 990 also includes a keyboard 923, a mouse 924, and a printer 925. In this example, the keyboard 923, the mouse 924, and the printer 925 are directly coupled to the I/O interface 922. Sometimes this coupling is via the USB ports 929.

In this context, "machine-readable medium" refers to a component, device or other tangible media able to store instructions and data temporarily or permanently and may include, but is not be limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing. The machine that would read such a medium includes one or more processors 994.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

OPERATIONAL EXAMPLES—USE CASES

The above-mentioned embodiments have one or more uses. Aspects presented below may be implemented as was described above for similar aspects. Some, but not all of these aspects even have reference numerals that are similar to aspects described above, for ease of explanation and understanding.

Figure 10:
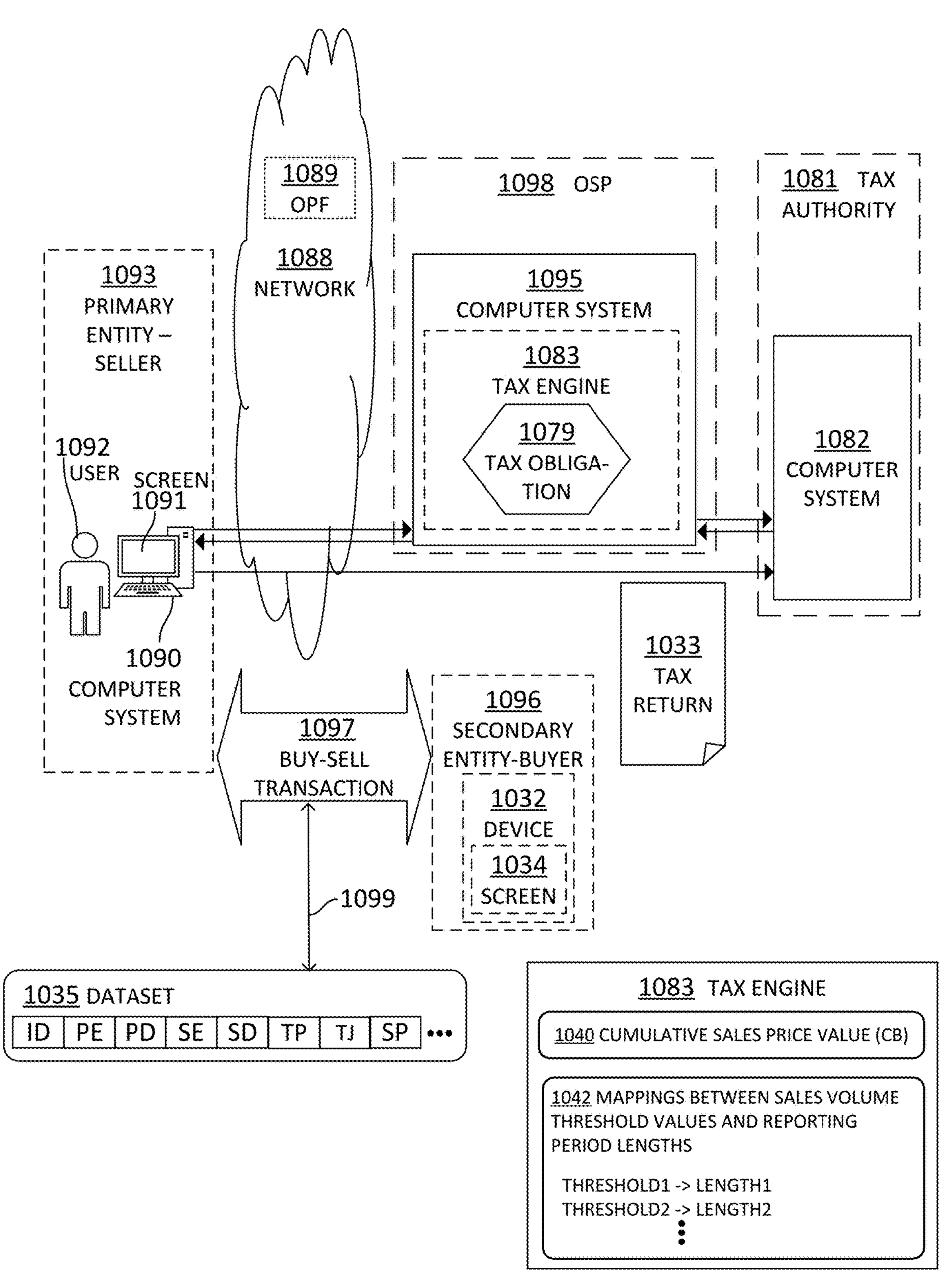
FIG. 10 is a diagram showing an operational example where a buy-sell transaction is a use case of the relationship instance, according to some embodiments.

FIG. 10 is a diagram showing an operational example where a buy-sell transaction 1097 is a use case of the relationship instance 197. The transaction 1097 is conducted between a primary entity 1093, which is a seller, and a secondary entity 1096, which is a buyer. The transaction 1097 is therefore a buy-sell transaction between them, for instance for a physical item, but it could be a non-physical item such as a digital item, a specific right, and so on. A tax obligation 1079 often arises from the transaction 1097—in particular a sales and/or use tax must be paid by either the primary entity 1093 or the secondary entity 1096, and/or documents must be prepared and filed, such as tax returns, compliance forms, etc. A computation of the tax obligation 1079 is a use case of producing the resource 179. A preparation of a tax return 1033 is a use case of preparing the report 133.

It will be recognized that aspects of FIG. 10 have similarities with aspects of FIG. 1. Portions of such aspects may be implemented as described for analogous aspects of FIG. 1. In particular, a computer system 1095 is shown, which is used to help customers, such as a user 1092, with tax compliance. For instance, the user 1092 may log into the computer system 1095 by using credentials, such as a user name, a password, a token, and so on. Further in this example, the computer system 1095 is part of an OSP 1098 that is implemented as a Software as a Service (SaaS) provider, for being accessed by the user 1092 online. As such, the OSP 1098 can be an online service provider for clients. Alternately, the functionality of the computer system 1095 may be provided locally to a user.

The user 1092 may be standalone. The user 1092 may use a computer system 1090 that has a screen 1091. In embodiments, the user 1092 and the computer system 1090 are considered part of the primary entity 1093, which is also known as entity 1093. The primary entity 1093 can be a business, such as a seller of items, a reseller, a buyer, a service business, and so on. In such instances, the user 1092 can be an employee, a contractor, or otherwise an agent of the entity 1093.

The buyer 1096 can be an organization, a person, and so on. The buyer 1096 has a device 1032 with a screen 1034. The buyer 1096 may have used a device such as the device 1032 for the buy-sell transaction 1097.

The buy-sell transaction 1097 may involve an operation, such as an exchange of data to form an agreement. This operation can be performed in person, or over a network 1088, which can be as described elsewhere for communications networks, etc. In such cases, the entity 1093 can even be an online seller, but that is not necessary. The transaction 1097 will have data that is known to the entity 1093, similarly with what was described by the relationship instance 197 of FIG. 1.

In a number of instances, the user 1092 and/or the entity 1093 use software applications to manage their business activities, such as sales, resource management, production, inventory management, delivery, billing, and so on. The user 1092 and/or the entity 1093 may further use accounting applications to manage purchase orders, sales invoices, refunds, payroll, accounts payable, accounts receivable, and so on. Such software applications, and more, may be used locally by the user 1092, or from an Online Processing Facility (OPF) 1089 that has been engaged for this purpose by the user 1092 and/or the entity 1093. The OPF 1089 can be analogous to the OPF 189. In such use cases, the OPF 1089 can be a Mobile Payments system, a Point Of Sale (POS) system, an Accounting application, an Enterprise Resource Planning (ERP) provider, an e-commerce provider, an electronic marketplace, a Customer Relationship Management (CRM) system, and so on.

Businesses have tax obligations to various tax authorities of respective tax jurisdictions. It is often challenging to even determine what taxes are owed and to whom, because the underlying statutes and tax rules and guidance issued by the tax authorities are very complex. There are various types of tax, such as sales tax, use tax, excise tax, value-added tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived.

Tax jurisdictions are defined mainly by geography. Businesses have tax obligations to various tax authorities within the respective tax jurisdictions. There are various tax authorities, such as that of a group of countries, of a single country, of a state, of a county, of a municipality, of a city, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax based on the sales transactions, e) file the tax return with the tax authority by a deadline determined by the tax authority, and f) pay ("remit") that amount of money to the tax authority. In such cases, the filing and payment frequency and deadlines are determined by the tax authority.

A challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities—if the seller cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome for the amounts of money involved. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes can be considered trust-fund taxes, meaning that the management of a company may be held personally liable for the unpaid sales tax.

For sales in particular, making correct determinations for sales and use tax is even more complex, and therefore difficult. There are a number of factors that contribute to the complexity.

First, some state and local tax authorities have origin-based tax rules, while others have destination-based tax rules. Accordingly, a sales tax may be charged from the seller's location, meaning according to the rules of the tax authority of the seller, or from the buyer's location, meaning according to the rules of the tax authority of the buyer.

Second, the various tax authorities assess different, i.e., non-uniform, percentage rates of the sales price as sales tax, for the purchase and sale of items that involve their various tax jurisdictions. These tax jurisdictions include various states, counties, cities, municipalities, special taxing jurisdictions, and so on. As the United States switched, largely but not completely, from primarily origin-based sales tax to destination-based tax, the number of tax jurisdictions rapidly multiplied, and the incentives for local governments to implement new and varied tax rules and ever smaller jurisdictions multiplied. As such, there are over 10,000 different tax jurisdictions in the US, with many partially overlapping. Their sizes vary from as large as many square miles to as small as a single building. In parallel, tens of thousands of tax rules and tax rates have been developed.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is, and/or what the purchase is for. For example, certain entities are exempt from paying sales tax on their purchases, as long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid. And, certificates of exemption may expire after some time, and may need to be renewed or reissued.

Fifth, it can be hard to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

The economic nexus mentioned above can be even more complicated. Even where a seller might not have reached any of the thresholds for economic nexus, a number of states are promulgating marketplace facilitator laws that sometimes use such thresholds. According to such laws, intermediaries that are characterized as marketplace facilitators per laws of the state may have an obligation, instead of the seller, to collect sales tax on behalf of their sellers, and remit it to the state. The situation becomes even more complex when a seller sells directly to a state, and also via such an intermediary.

To help with such complex determinations, the computer system 1095 may be specialized for tax compliance. For instance, the computer system 1095 thus implements a tax engine 1083 to make the determinations of tax obligations. The tax engine 1083 can be as described for the service engine 183.

For a specific determination of a tax obligation, the computer system 1095 may receive one or more datasets. A sample received dataset 1035 is shown in the diagram. The dataset 1035 has parameters that can also be called dataset parameters, some of which can have respective dataset values, and can be otherwise examples of what was described for the dataset 135 of FIG. 1. The computer system 1090 may transmit a request that includes the dataset 1035 as a payload to the computer system 1095, and the computer system 195 may extract the dataset 1035 by parsing the received payload. The entire dataset 1035 may be encoded as a single payload or spread across multiple payloads.

In this example, the dataset 1035 has been received because it is desired to determine any tax obligations arising from the buy-sell transaction 1097. As such, the sample received dataset 1035 has dataset parameters with values that characterize attributes of the buy-sell transaction 1097, as indicated by a correspondence arrow 1099. The dataset 1035 may thus represent the buy-sell transaction 1097. In this example the sample received dataset 1035 has a parameter ID with a value for an identity of the dataset 1035 and/or the transaction 1097. The dataset 1035 also has a parameter PE with a value for the name of the primary entity 1093 or the user 1092, which can be the seller making sales transactions, some perhaps online. The dataset 1035 further has an optional parameter PD with a value for relevant data of the primary entity 1093 or the user 1092, such as an address, place(s) of business, prior nexus determinations with various tax jurisdictions, and so on. The parameter PD is optional because it may be possible to look up its value from the parameter PE. The dataset 1035 also has a parameter SE with a value for the name of the secondary entity 1096, which can be the buyer. The dataset 1035 further has a parameter SD with a value for relevant data of the secondary entity 1096, such as entity-driven exemption status, and so on. In some instances, the parameter SD is optional, similarly with the parameter PD. The dataset 1035 also has a parameter TP with a value for the data/time at which the buy-sell transaction 1097 occurred. The time period associated with the buy-sell transaction 1097 can be inferred from the value of the TP parameter. The dataset 1035 also has a parameter TJ with a value indicating the relevant tax jurisdiction for tax purposes (e.g., the state in which the buyer 1096 resides). The tax jurisdiction may be akin to a domain 181 in certain use cases. The dataset 1035 has a parameter SP with a numerical value for the sale price of the item sold. The dataset 1035 may further have additional dataset parameters, as indicated by the dot-dot-dot in the right side of the dataset 1035. These parameters may characterize further attributes, such as what item was sold, for example by a Stock Keeping Unit (SKU), how many units of the item were sold in the transaction 1097, and so on.

Then the computer system 1095 may produce the tax obligation 1079, which is akin to producing the resource 179 of FIG. 1. The tax obligation 1079 is due to the tax authority 1081 of the tax jurisdiction. In some instances, the tax obligation 1079 is fulfilled by the user 1092 using the computer system 1090 to access the computer system 1082. In some instances, the tax obligation 1079 is fulfilled by the computer system 1095 accessing the computer system 1082 on behalf of the user 1092.

The dataset 1035 is shown only as an example. In fact, the OSP 1098 may receive multiple datasets for multiple tax jurisdictions from the primary entity 1093, for its sales. Datasets may be received incrementally over a long time.

In an embodiment, the tax engine 1083 maintains a cumulative sales price value 1040 and mappings 1042 between sales volume threshold values and reporting period lengths. The cumulative sales price value 1040 may be akin to the cumulative base value 140. The sales volume threshold values included in mappings 1042 may be akin to the threshold values included in mappings 142. The cumulative sales price value 1040 may be associated with the seller 1093, a tax jurisdiction, and a current time period. Although for the sake of simplicity the diagram shows the tax engine 1083 as maintaining a single cumulative sales price value 1040, it should be appreciated that the tax engine 1083 may maintain multiple such cumulative sales price values for the seller 1093, each associated with a different tax jurisdiction in which the seller 1093 has an obligation to file tax returns. Also, although not shown in the diagram, it should be appreciated that the tax engine 1083 may maintain separate cumulative sales price values for multiple different entities besides the seller 1093. The mappings 1042 may be specific to the tax jurisdiction and reflect the tax return filing requirement of the tax jurisdiction. Although for the sake of simplicity the diagram shows the tax engine 1083 as maintaining mappings 1042 for a single tax jurisdiction, it should be appreciated that the tax engine 1083 may maintain separate mappings for multiple different tax jurisdictions that reflect the tax return filing requirements of the respective tax jurisdictions.

In operation, the computer system 1095 may receive, via the network 1088, a first set of datasets of buy-sell transactions that are associated with the seller 1093, the tax jurisdiction, and a first time period, wherein each dataset of the first set of datasets includes a sales price value for a particular buy-sell transaction. The first time period may have a length that corresponds to a first reporting period length. The computer system 1095 may maintain a cumulative sales price value 1040 associated with the seller 1093, the tax jurisdiction, and the first time period, wherein the cumulative sales price value 1040 represents a cumulative sum of the sales price values included in the first set of datasets. If the computer system 1095 detects that the cumulative sales price value 1040 exceeds a predefined sales volume threshold value (e.g., a sales volume threshold value included in mappings 1042), the computer system 1095 may change a reporting period length associated with the seller 1093 and the tax jurisdiction from the first reporting period length to a second reporting period length (a length corresponding to the sales volume threshold value in mappings 1042) that is shorter than the first reporting period length. The computer system 1095 may then cause a tax return 1033 to be prepared using the second reporting period length and transmit the tax return 1033 via the network 1088 to a computer system 1082 of the tax authority 1081 of the tax jurisdiction. The tax return 1033 may include statistics of datasets of buy-sell transactions that are associated with the seller 1093, the tax jurisdiction, and a preceding time period that has a length corresponding to the second reporting period length. For example, the tax return may include an accurate determination of the amount of the money owed by the seller 1093 to the tax authority 1081 of the tax jurisdiction as sales tax based on the sales price values for the buy-sell sales transactions. In an embodiment, the computer system 1095 causes the prepared tax return 1033 to be presented to an authorized agent of the seller 1093 for electronic signature before transmitting the (signed) tax return 1033 to the computer system 1082 of the tax authority 1081 on behalf of the seller 1093.

In operation, the computer system 1095 may receive, via the network 1088, a second set of datasets of buy-sell transactions that are associated with the seller 1093, the tax jurisdiction, and a second time period, wherein each dataset of the second set of datasets includes a sales price value for a particular buy-sell transaction. The second time period may have a length that corresponds to a third reporting period length. The computer system 1095 may maintain a cumulative sales price value 1040 associated with the seller 1093, the tax jurisdiction, and the second time period, wherein the cumulative sales price value 1040 represents a cumulative sum of the sales price values included in the second set of datasets. If the computer system 1095 determines that the cumulative sales price value 1040 does not exceed a predefined sales volume threshold value (e.g., a sales volume threshold value included in mappings 1042) at the end of the second time period, the computer system 1095 may change a reporting period length associated with the seller 1093 and the tax jurisdiction from the third reporting period length to a fourth reporting period length (a length corresponding to the sales volume threshold value in mappings 1042) that is longer than the third reporting period length. The computer system 1095 may then cause a tax return 1033 to be prepared using the fourth reporting period length and transmit the tax return 1033 via the network 1088 to a computer system 1082 of the tax authority 1081 of the tax jurisdiction. The tax return 1033 may include statistics of datasets of buy-sell transactions that are associated with the seller 1093, the tax jurisdiction, and a preceding time period that has a length corresponding to the fourth reporting period length. In an embodiment, the computer system 1095 causes the prepared tax return 1033 to be presented to an authorized agent of the seller 1093 for electronic signature before transmitting the (signed) tax return 1033 to the computer system 1082 of the tax authority 1081 on behalf of the seller 1093.

In an embodiment, the computer system 1095 may start preparing a new type of tax return on behalf of a seller 1093 (e.g., a type of tax return that is currently not being prepared on behalf of the seller) if the cumulative sales price value associated with the seller 1093, the tax jurisdiction, and a time period exceeds a predefined sales volume threshold value.

For example, in operation, the computer system 1095 may receive, via the network 1088, a third set of datasets of buy-sell transactions that are associated with the seller 1093, the tax jurisdiction, and a third time period, wherein each dataset of the third set of datasets includes a sales price value for a particular buy-sell transaction. The computer system 1095 may maintain a cumulative sales price value 1040 associated with the seller 1093, the tax jurisdiction, and the third time period, wherein the cumulative sales price value 1040 represents a cumulative sum of the sales price values included in the third set of datasets. If the computer system 1095 detects that the cumulative sales price value 1040 exceeds a predefined threshold value, the computer system 1095 may determine that a tax return of a particular tax return type is to be prepared, wherein the particular tax return type is different from a type of tax return currently being prepared by the computer system 1095 on behalf of the seller 1093. The computer system 1095 may then cause a tax return 1033 of the particular tax return type to be prepared and transmitted via the network 1088 to a computer system 1082 of the tax authority 1081 of the tax jurisdiction. The tax return 1033 may include statistics of datasets of buy-sell transactions that are associated with the seller 1093, the tax jurisdiction, and a preceding time period. In an embodiment, the computer system 1095 causes the prepared tax return 1033 to be presented to an authorized agent of the seller 1093 for electronic signature before transmitting the (signed) tax return 1033 to the computer system 1082 of the tax authority 1081 on behalf of the seller 1093.

In an embodiment, buy-sell transactions can be associated with certain items, and the computer system 1095 maintains cumulative sales price values on a per-item basis. For example, the computer system 1095 may maintain a cumulative sales price value that is associated with the seller 1093, the tax jurisdiction, a particular item, and a time period. The computer system 1095 may cause a new type of tax return (e.g., that pertains to the particular item) to be prepared if it detects that such cumulative sales price value exceeds a predefined sales volume threshold value during the time period. For example, if the seller 1093 was not selling tobacco before or its sales volume of tobacco was too low to attract an excise tax, but the seller 1093 starts selling sufficient amounts of tobacco to attract an excise tax, the computer system 1095 may detect this and cause a tax return for excise tax to be prepared on behalf of the seller 1093. More generally, the computer system 1095 may maintain cumulative sales price values on a per-item, per-tax jurisdiction, per-seller, and/or per-buyer basis, and change the reporting period length for preparing tax returns and/or cause new types of tax returns to be prepared when a cumulative sales price value exceeds a predefined sales volume threshold, in accordance with the tax return filing requirement of the tax jurisdiction.

Figure 11:
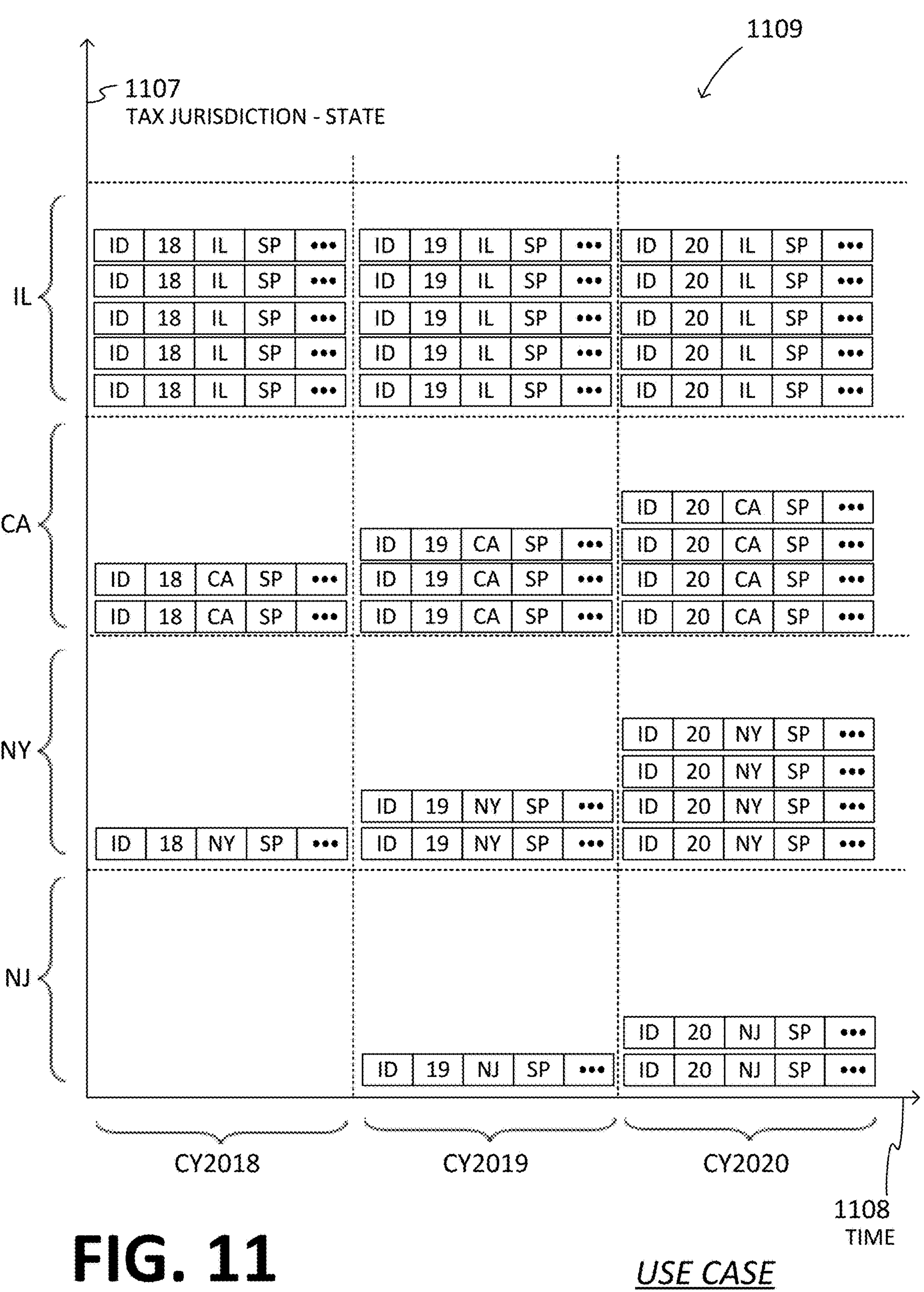
FIG. 11 is a diagram showing how sample datasets received by the OSP can be grouped or categorized, in a use case where the datasets represent buy-sell transactions, according to some embodiments.

FIG. 11 is a diagram showing how sample datasets received by the OSP can be grouped or categorized, in a use case where the datasets represent buy-sell transactions, according to some embodiments.

As shown in the diagram, the datasets 1109 may be grouped or categorized along a vertical tax jurisdiction axis 1107 and a horizontal time axis 1108 to form a matrix of cells, where each cell of the matrix contains the datasets of buy-sell transactions that occurred during a particular calendar year and that are associated with a particular tax jurisdiction. In this example, the tax jurisdictions are states of the United State of America (USA). The grouping indicates which buy-sell transactions are taxable by which state and during which calendar year.

A confusion that should not reign is that, while in FIG. 11 the datasets are shown in buckets of calendar years, in embodiments they may be processed dynamically as they are received during the calendar years.

Each dataset of the datasets 1109 may describe aspects of a particular buy-sell transaction. In this sense, each dataset may represent a buy-sell transaction. Each dataset may include an ID value that uniquely identifies the dataset. Each dataset may also include a time value that indicates the calendar year during which the buy-sell transaction represented by the dataset occurred. In this example, the time value is one of three values: 18 (calendar year 2018), 19 (calendar year 2019), and 20 (calendar year 2020). In embodiments, the time value is expressed more granularly than the calendar year. For instance, the time value may be expressed as a time/date of when a buy-sell transaction occurred, and the calendar year can be inferred from the time/date. Each dataset may include a tax jurisdiction value that indicates the tax jurisdiction associated with the buy-sell transaction represented by the dataset. The tax jurisdiction may be a state in which the buyer resides or is otherwise associated with. In this example, the tax jurisdiction value is one of four values: IL (Illinois), CA (California), NY (New York), and NJ (New Jersey). Each dataset may include a sales price value (e.g., in US dollars or any other unit of currency) for the buy-sell transaction represented by the dataset. In the diagram, the sales price value is shown using the sales price parameter symbol SP. Each dataset may have potentially different sales price values but the actual sales price values are not shown in the diagram since the actual sales price values are not necessary for understanding how datasets can be grouped or categorized. Each dataset may have additional values (corresponding to additional parameters), as indicated by the horizontal dot-dot-dots.

In embodiments, the sales price values for buy-sell transactions associated with the same tax jurisdiction and time period are cumulatively summed, starting with zero, at the beginning of the time period. If the cumulative sum exceeds a predefined sales volume threshold value during the time period, the reporting period length may be shortened (e.g., to increase the tax return filing frequency). In embodiments, if the cumulative sum does not exceed a predefined sales volume threshold value at the end of the time period, the reporting period length may be lengthened (e.g., to decrease the tax return filing frequency).

Figure 12:
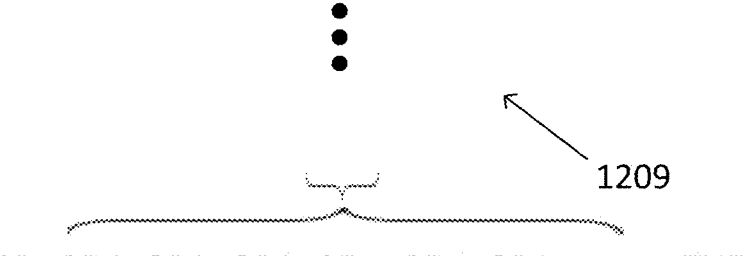
FIG. 12 is a diagram showing how a cumulative sales price value can be generated based on summing the sales price values of datasets of arriving datasets, according to some embodiments.

FIG. 12 is a diagram showing how a cumulative sales price value can be generated based on summing the sales price values of datasets 1209 of arriving datasets, according to some embodiments.

The datasets 1209 shown in the diagram may be the datasets of any one of the cells of the matrix shown in FIG. 11. The datasets 1209 may thus have the same tax jurisdiction value of ST (which may be a particular state of the USA) and the same time period value of CY (which may be a particular calendar year). However, the datasets 1209 have different numeric sales price values of SP1, SP2, SP3, SP4, SP5, and SP6, respectively, for the sales price parameter. Although not shown in the diagram, the datasets 1209 may represent buy-sell transactions associated with the same seller. Thus, the datasets 1209 may represent buy-sell transactions associated with the same seller, state ST, and calendar year CY.

In embodiments, the computer system of the OSP may periodically prepare tax returns (e.g., tax return 1033 shown in FIG. 10) that include statistics of datasets of buy-sell transactions associated with the seller, the state ST, and a calendar year (e.g., the OSP may prepare tax returns annually). The computer system may transmit the tax return to the computer system of the state ST (e.g., computer system 1082 shown in FIG. 10) on behalf of the seller and/or transmit the tax return to the computer system of the seller (e.g., computer system 1090 shown in FIG. 10) so that an agent of the seller can submit the tax return to the computer system of the state ST (e.g., by uploading the reports to the computer system 1082 of the tax authority 1081 or by other means).

In embodiments, the computer system of the OSP maintains a cumulative sales price value (e.g., cumulative sales price value 1040 shown in FIG. 10) that is associated with the seller, the state ST, and a calendar year CY by summing the sales price values of the datasets 309 as each dataset is received and/or processed. The cumulative sales price value may be designated using the symbol CB. The cumulative sales price value may be initialized to a value of zero at the beginning of the current calendar year CY and then gradually increase as the datasets 309 are received and/or processed. The computer system may compare the cumulative sales price value to a predefined sales volume threshold value (e.g., a sales volume threshold value included in the mappings 1042 shown in FIG. 10) to determine whether the cumulative sales price value has exceeded the predefined sales volume threshold value. If the computer system determines that that the cumulative sales price value has exceeded the predefined sales volume threshold value during the current calendar year CY, then the computer system may shorten the reporting period length, which is equivalent to increasing the tax return filing frequency.

FIG. 13 is a diagram showing the reporting period length being shortened due to the cumulative sales price value exceeding a predefined sales volume threshold value, according to some embodiments.

The diagram shows a graph with an x-axis that represents time and a y-axis that represents the cumulative sales price value for a given time period. A cumulative sales price value (CB) may be maintained during a first time period as datasets of buy-sell transactions associated with a seller, a tax jurisdiction, and the first time period are received and processed. The first time period may have a length that corresponds to a first reporting period length as specified by the tax return filing requirement of the tax authority of the tax jurisdiction. In this example, the cumulative sales price value does not exceed the predefined sales volume threshold value during the first time period. Thus, there is no change to the reporting period length. At the end of the first time period, a tax return may be prepared for the first time period and the tax return may be sent to the computer system of the tax authority of the tax jurisdiction. The cumulative sales price value is reset (to zero) at the beginning of the second time period. The second time period may have a length corresponding to the first reporting period length. A cumulative sales price value may be maintained during the second time period as datasets of buy-sell transactions associated with the seller, the tax jurisdiction, and the second time period are received and processed. In this example, the cumulative sales price value again does not exceed the predefined sales volume threshold value during the second time period. Thus, there is no change to the reporting period length. At the end of the second time period, a tax return may be prepared for the second time period and the tax return may be sent to the computer system of the tax authority of the tax jurisdiction. The cumulative sales price value is reset (to zero) at the beginning of the third time period. The third time period initially has a length corresponding to the first reporting period length but, as will be described in additional detail herein, the length of the third time period may be shortened due to the cumulative sales price value exceeding the sales volume threshold value during the third time period. A cumulative sales price value may be maintained during the third time period as datasets of buy-sell transactions associated with the seller, the tax jurisdiction, and the third time period are received. In this example, the cumulative sales price value exceeds the predefined sales volume threshold value during the third time period. As a result, the reporting period length may be shortened to have a length that corresponds to a second reporting period length. The shortened reporting period length may apply to the current time period in which the cumulative sales price value exceeded the predefined sales volume threshold value or the following time period. In this example, it is assumed that the shortened reporting period length applies to the current time period. Thus, the length of the third time period is shortened so that it corresponds to the second reporting period length (instead of the first reporting period length). A tax return may be prepared for the (shortened) third time period and the tax return may be sent to the computer system of the tax authority of the tax jurisdiction. The cumulative sales price value is reset (to zero) at the beginning of the fourth time period. The fourth time period may have a length corresponding to the second reporting period length. A tax return is prepared for the fourth time period and the tax return may be sent to the computer system of the tax authority of the tax jurisdiction. In an embodiment, the second reporting period length may continue to be used for preparing tax returns until a cumulative sales price value does not exceed a sales volume threshold value by the end of a time period. In an embodiment, the second reporting period length is used for preparing tax returns for a predefined number of time periods and then tax returns are subsequently prepared using the first reporting period length again.

The reporting period lengths may depend on the tax return filing requirement of the tax authority of the tax jurisdiction. For example, the tax authority may have a table that maps sales volume threshold values to reporting period lengths, where the larger the sales volume threshold value the shorter the reporting period length. The contents of the table may be stored in tax engine 1083 (e.g., using any suitable data structure) or otherwise made accessible to the tax engine 1083 so that they can be easily retrieved.

In an embodiment, if the cumulative sales price value does not exceed a predefined sales volume threshold value at the end of the current time period, the reporting period length may lengthen, and a tax return is not prepared using the first reporting period length, but is prepared using a second reporting period length that is longer than the first reporting period length. Thus, if the cumulative sales price value is too low by the end of the current time period, a tax return may not be prepared yet, but prepared and submitted later.

Figure 14:
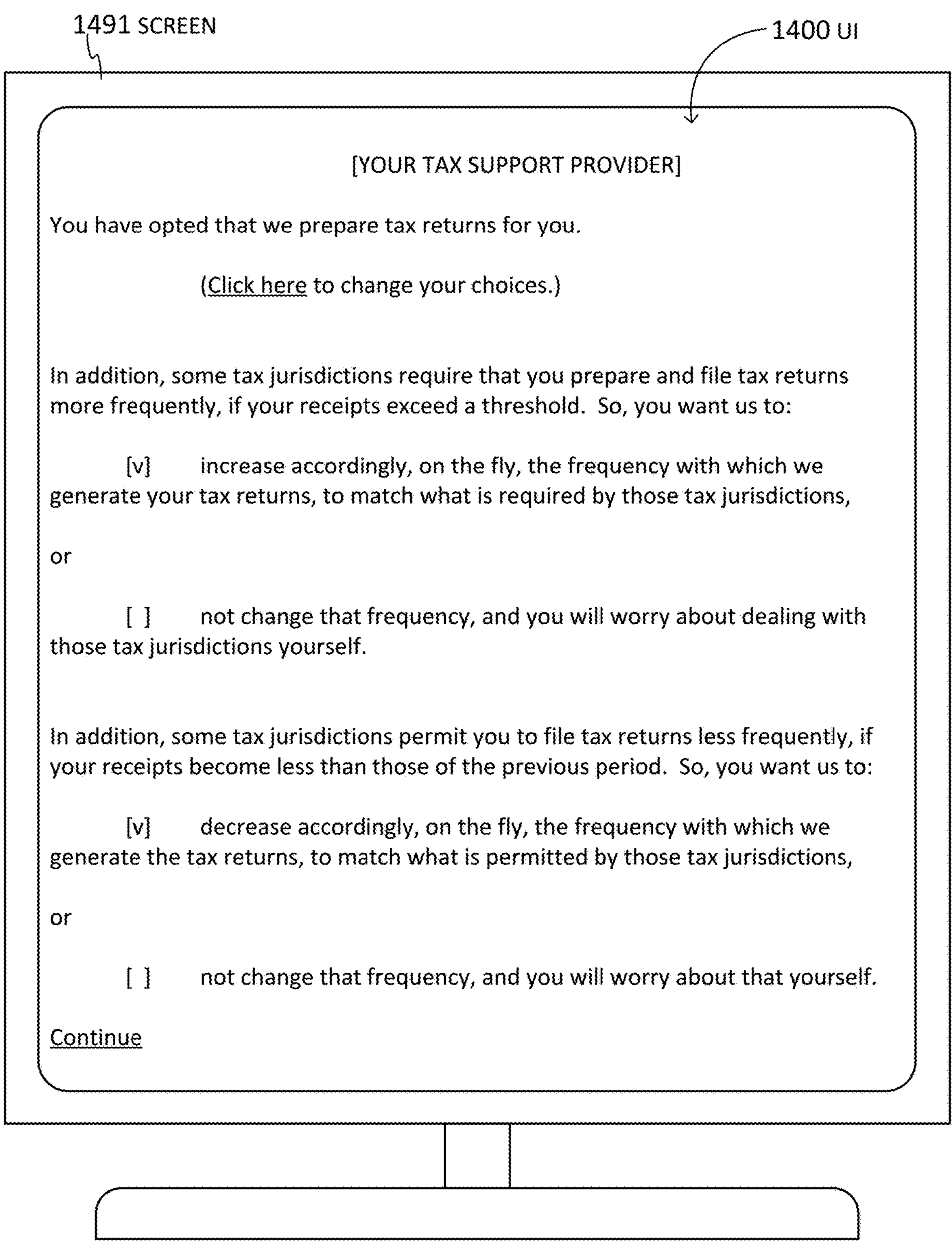
FIG. 14 is a diagram showing a sample UI shown on a screen, according to some embodiments.

FIG. 14 is a diagram showing a sample UI shown on a screen, according to some embodiments. In embodiments, the user is enabled to choose the feature of dynamically changing the reporting period length used for preparing tax returns as an option using a UI shown on a screen 1491. The screen 1491 could be the screen 1091 of FIG. 10. The UI 1400 can be displayed to a user to allow the user to configure the OSP to dynamically change the reporting period lengths used for preparing tax returns according to the tax return filing requirement of a tax authority. In particular, the UI 1400 presents an option for the user to have the OSP increase, on the fly, the tax return filing frequency (e.g., shorten the reporting period length) if the cumulative sales price value exceeds a sales volume threshold value during a time period and also presents an option for the user to have the OSP decrease, on the fly, the tax return filing frequency (e.g., lengthen the reporting period length) if the cumulative sales price value does not exceed another predefined sales volume threshold value during a time period (e.g., if permitted by the tax return filing requirement of the tax authority).

Figure 15:
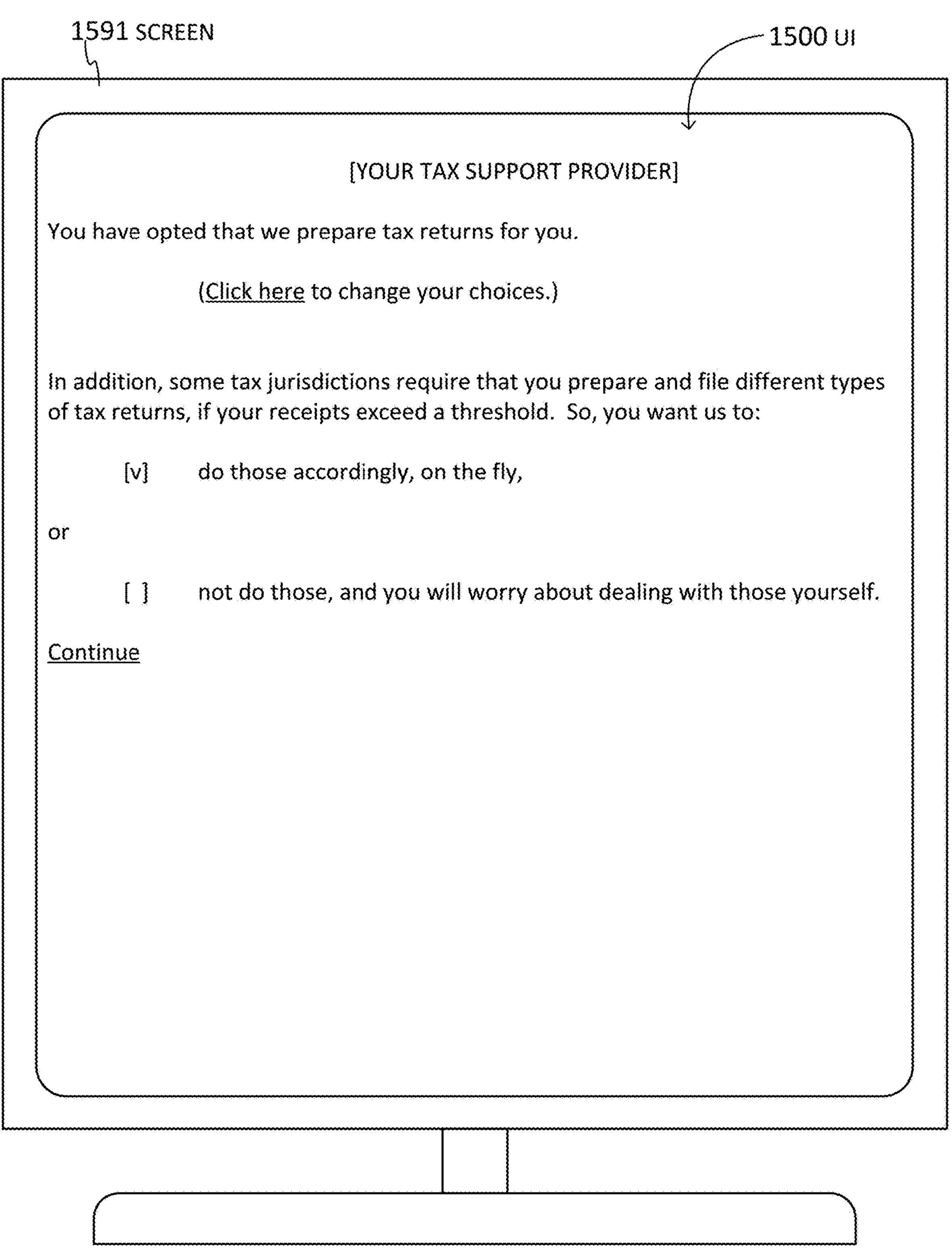
FIG. 15 is a diagram showing a sample UI shown on a screen, according to some embodiments.

FIG. 15 is a diagram showing a sample UI shown on a screen, according to some embodiments. In embodiments, the user is enabled to choose the feature of dynamically filing a new type of tax return as an option using a UI shown on a screen 1591. The screen 1591 could be the screen 1091 of FIG. 10. The UI 1500 can be displayed to a user to allow the user to configure the OSP to dynamically file different types of tax returns according to the tax return filing requirement of a tax authority. In particular, the UI 1500 presents an option for the user to have the OSP prepare, on the fly, a different type of tax return (e.g., a type of tax return from the tax returns that the OSP is currently preparing for the user) if the cumulative sales price value exceeds a sales volume threshold value during a time period.

GENERAL

Software aspects of embodiments may include instructions for processors, methods of operation, datasets, interfaces, user interfaces (UIs), applications, Application Programming Interfaces (APIs), connectors, and the like.

Software aspects or modules of embodiments can be hosted on any suitable machine, anywhere. For example, such software aspects can be hosted on a computer system, a desktop computer, an on-location server, a machine that is located remotely to where other processes are executed, such as in the cloud or on the premises of a provider, a memory of such, and so on. The software can be accessible by a user via a browser, a UI, an API, etc. Depending on where hosted, some software components or modules can be considered a client, etc.

Importantly, although the operational and or functional descriptions of this document are understandable by the human mind, they are not abstract ideas of the operations/functions divorced from computational implementation of those operations/functions. Rather, the operations/functions represent a specification for complex computational machines or other means. As discussed in detail elsewhere in this document, each time the operational/functional language must be read in its proper technological context, i.e., as concrete specifications for physical implementations. Far from being understood as an abstract idea, it can be recognized that a functional/operational technical description as a humanly-understandable representation of one or more almost unimaginably complex and time sequenced hardware instantiations.

Moreover, the methods, algorithms, operations, functions and acts described in this document are not necessarily inherently associated with any particular logic device or other apparatus. Rather, they are advantageously implemented by programs for use by any of the devices or systems described in this document. These algorithms are not necessarily purely mathematical, and are configured to address challenges particular to the problem solved, as will be apparent to a person skilled in the art.

This detailed description may include flowcharts, display images, algorithms, and symbolic representations of program operations within at least one computer readable medium. An economy may be achieved in that a single set of flowcharts can be used to describe both programs, and also methods. So, while flowcharts describe methods in terms of boxes, they may also concurrently describe programs.

In the methods described above, each operation can be performed as an affirmative step of doing, or causing to happen, what is written that can take place. Such doing or causing to happen can be by the whole system or device, or just one or more components of it. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

At least one of the methods described herein, when implemented by a computer, can be performed at the rate of at least 10 times per second.

This description includes one or more examples, but that does not limit how the invention may be practiced. Indeed, examples or embodiments of the invention may be practiced according to what is described, or yet differently, and also in conjunction with other present or future technologies. Other embodiments include combinations and sub-combinations of features described or shown in the drawings herein, including for example, embodiments that are equivalent to: providing or applying a feature in a different order than in a described embodiment, extracting an individual feature from one embodiment and inserting such feature into another embodiment; removing one or more features from an embodiment; or both removing one or more features from an embodiment and adding one or more features extracted from one or more other embodiments, while providing the advantages of the features incorporated in such combinations and sub-combinations. As used in this paragraph, feature or features can refer to the structures and/or functions of an apparatus, article of manufacture or system, and/or the steps, acts, or modalities of a method.

A person skilled in the art will be able to practice the present invention in view of this description, which is to be taken as a whole. Details have been included to provide a thorough understanding. In other instances, well-known aspects have not been described, in order to not obscure unnecessarily the present invention. Plus, any reference to any prior art in this description is not, and should not be taken as, an acknowledgement or any form of suggestion that this prior art forms parts of the common general knowledge in any country.

Some technologies or techniques described in this document may be known. Even then, however, it does not necessarily follow that it is known to apply such technologies or techniques as described in this document, or for the purposes described in this document.

A number of embodiments are possible, each including various combinations of elements. When one or more of the appended drawings—which are part of this specification—are taken together, they may present some embodiments with their elements in a manner so compact that these embodiments can be surveyed quickly. This is true even if these elements are described individually extensively in this text, and these elements are only optional in other embodiments.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases "constructed to", "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Parent patent applications: Any and all parent, grandparent, great-grandparent, etc. patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, component or process that are identical or at least similar or related. Where made, such a further effort was not required, but was nevertheless made gratuitously so as to accelerate comprehension by the reader. Even where made in this document, such a further effort might not have been made completely consistently for all of the versions or embodiments that are made possible by this description. Accordingly, the description controls in defining an item, aspect, component or process, rather than its reference numeral. Any similarity in reference numerals may be used to infer a similarity in the text, but not to confuse aspects where the text or other context indicates otherwise.

The claims of this document may define certain combinations and sub-combinations of elements, features and acts or operations, which are regarded as novel and non-obvious. The claims may also include elements, features and acts or operations that are equivalent to what is explicitly mentioned. Additional claims for other such combinations and sub-combinations may be presented in this or a related document. These claims are intended to encompass within their scope all changes and modifications that are within the true spirit and scope of the subject matter described herein.

The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

In construing the claims of this document, 35 U.S.C. § 112(f) is invoked by the inventor(s) only when the words "means for" or "steps for" are expressly used in the claims. Accordingly, if these words are not used in a claim, then that claim is not intended to be construed by the inventor(s) in accordance with 35 U.S.C. § 112(f).

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method performed by a computer system of an online software platform (OSP), the method comprising:

receiving, via a network, a first set of datasets of relationship instances that are associated with a primary entity, a first domain from a plurality of domains, and a first time period, wherein each dataset of the first set of datasets includes a base value for a particular relationship instance;

maintaining a first cumulative base value associated with the primary entity, the first domain, and the first time period, wherein the first cumulative base value represents a cumulative sum of the base values included in the first set of datasets;

determining whether the first cumulative base value exceeds a first predefined threshold value;

responsive to determining that the first cumulative base value exceeds the first predefined threshold value, configuring the OSP to change a reporting period length associated with the primary entity and the first domain from a first reporting period length to a second reporting period length that is shorter than the first reporting period length; and causing, due to the configuring of the OSP, a first report to be prepared and transmitted via the network to a computer system of the first domain using the second reporting period length, wherein the first report includes statistics of datasets of relationship instances that are associated with the primary entity, the first domain, and a preceding time period that has a length corresponding to the second reporting period length.

2. The method of claim 1, wherein the first reporting period length corresponds to a calendar year and the second reporting period length corresponds to a quarter of the calendar year.

3. The method of claim 1, wherein the first reporting period length corresponds to a quarter of a calendar year and the second reporting period length corresponds to a calendar month.

4. The method of claim 1, further comprising:

receiving, via the network, a second set of datasets of relationship instances that are associated with the primary entity, the first domain, and a second time period, wherein each dataset of the second set of datasets includes a base value for a particular relationship instance;

maintaining a second cumulative base value associated with the primary entity, the first domain, and the second time period, wherein the second cumulative base value represents a cumulative sum of the base values included in the second set of datasets;

determining whether the second cumulative base value exceeds a second predefined threshold value at an end of the second time period;

responsive to determining that the second cumulative base value does not exceed the second predefined threshold value, changing the reporting period length associated with the primary entity and the first domain from a third reporting period length to a fourth reporting period length that is longer than the third reporting period length; and causing a second report to be prepared and transmitted via the network to the computer system of the first domain using the fourth reporting period length, wherein the second report includes statistics of datasets of relationship instances that are associated with the primary entity, the first domain, and a preceding time period that has a length corresponding to the fourth reporting period length.

5. The method of claim 4, wherein the third reporting period length corresponds to a quarter of a calendar year and the fourth reporting period length corresponds to a calendar year.

6. The method of claim 4, wherein the third reporting period length corresponds to a calendar month and the fourth reporting period length corresponds to a quarter of a calendar year.

7. The method of claim 1, further comprising:

receiving, via the network, a second set of datasets of relationship instances that are associated with the primary entity, a second domain from the plurality of domains that is different from the first domain, and a second time period, wherein each dataset of the second set of datasets includes a base value for a particular relationship instance;

maintaining a second cumulative base value associated with the primary entity, the second domain, and the second time period, wherein the second cumulative base value represents a cumulative sum of the base values included in the second set of datasets;

determining whether the second cumulative base value exceeds a second predefined threshold value;

responsive to determining that the second cumulative base value exceeds the second predefined threshold value, changing a reporting period length associated with the primary entity and the second domain from a third reporting period length to a fourth reporting period length that is longer than the third reporting period length; and causing a second report to be prepared and transmitted via the network to a computer system of the second domain using the fourth reporting period length, wherein the second report includes statistics of datasets of relationship instances that are associated with the primary entity, the second domain, and a preceding time period that has a length corresponding to the fourth reporting period length.

8. The method of claim 1, further comprising:

determining to use the first predefined threshold value and the second reporting period length based on performing a look up in a data structure that includes mappings between threshold values and reporting period lengths for the first domain.

9. The method of claim 1, further comprising:

generating a user interface that allows an agent of the primary entity to request that the OSP automatically change the reporting period length associated with the primary entity and the first domain based on cumulative base values; and causing the user interface to be displayed on a screen of a device operated by the agent of the primary entity.

10. The method of claim 1, wherein each dataset of the first set of datasets further includes a domain value indicating that a particular relationship instance is associated with the first domain.

11. The method of claim 6, wherein each dataset of the first set of datasets further includes a time value indicating that a particular relationship instance is associated with the first time period.

12. The method of claim 1, further comprising:

receiving, via the network, a second set of datasets of relationship instances that are associated with the primary entity, a second domain from the plurality of domains that is different from the first domain, and a second time period, wherein each dataset of the second set of datasets includes a base value for a particular relationship instance;

maintaining a second cumulative base value associated with the primary entity, the second domain, and the second time period, wherein the second cumulative base value represents a cumulative sum of the base values included in the second set of datasets;

determining whether the second cumulative base value exceeds a second predefined threshold value;

responsive to determining that the second cumulative base value exceeds the second predefined threshold value, determining that a report of a particular report type is to be prepared, wherein the particular report type is different from a type of report currently being prepared by the OSP on behalf of the primary entity; and responsive to determining that the report of the particular report type is to be prepared, causing the report of the particular report type to be prepared and transmitted via the network to a computer system of the second domain, wherein the report of the particular report type includes statistics of datasets of relationship instances that are associated with the primary entity, the second domain, and a preceding time period.

* * * * *